United States Patent
Kanamarlapudi et al.

(10) Patent No.: US 12,470,641 B2
(45) Date of Patent: Nov. 11, 2025

(54) ROBUST HEADER COMPRESSION HANDLING DURING PACKET DATA CONVERGENCE PROTOCOL RE-ESTABLISHMENT

(71) Applicant: QUALCOMM Incorporated, San Diego, CA (US)

(72) Inventors: Sitaramanjaneyulu Kanamarlapudi, San Diego, CA (US); Arun Prasanth Balasubramanian, San Diego, CA (US); Leena Zacharias, San Jose, CA (US); Prasad Reddy Kadiri, San Diego, CA (US); Arnaud Meylan, San Diego, CA (US); Ozcan Ozturk, San Diego, CA (US); Yuyi Li, Shanghai (CN); Saket Bathwal, Hyderabad (IN); Vinay Paradkar, Broomfield, CO (US); Vishal Dalmiya, San Diego, CA (US); Peng Wu, Shanghai (CN); Vaishakh Rao, San Diego, CA (US); Ching Ho Weng, San Diego, CA (US); Sapna Chittoor Brahmanandam, Superior, CO (US)

(73) Assignee: QUALCOMM Incorporated, San Diego, CA (US)

( * ) Notice: Subject to any disclaimer, the term of this patent is extended or adjusted under 35 U.S.C. 154(b) by 565 days.

(21) Appl. No.: 17/800,518

(22) PCT Filed: Jan. 29, 2021

(86) PCT No.: PCT/CN2021/074414
§ 371 (c)(1),
(2) Date: Aug. 17, 2022

(87) PCT Pub. No.: WO2021/203809
PCT Pub. Date: Oct. 14, 2021

(65) Prior Publication Data
US 2023/0300222 A1    Sep. 21, 2023

Related U.S. Application Data

(60) Provisional application No. 63/007,828, filed on Apr. 9, 2020.

(51) Int. Cl.
H04L 69/04 (2022.01)
H04L 69/22 (2022.01)

(52) U.S. Cl.
CPC ............ H04L 69/04 (2013.01); H04L 69/22 (2013.01)

(58) Field of Classification Search
CPC ....... H04L 69/04; H04L 69/22; H04L 69/324; H04L 1/1838; H04L 1/189
(Continued)

(56) References Cited

U.S. PATENT DOCUMENTS 8,325,608 B2    12/2012  Kumar et al.
9,923,695 B2 *   3/2018  Kim ............... H04L 5/0055
(Continued)

FOREIGN PATENT DOCUMENTS

CN    101212404 A    7/2008
CN    106489280 A    3/2017
(Continued)

OTHER PUBLICATIONS

International Search Report and Written Opinion—PCT/CN2021/074414—ISA/EPO—Apr. 21, 2021.
Supplementary European Search Report—EP21785468—Search Authority—The Hague—Mar. 22, 2024.

*Primary Examiner* — Eugene Yun
(74) *Attorney, Agent, or Firm* — Paul M. McAdams; Polsinelli LLP

(57) ABSTRACT

A receiving device re-establishing a packet data convergence protocol (PDCP) entity. The receiving device resets a
(Continued)

robust header compression (ROHC) context. The receiving device receives packet retransmissions having header compression based on the ROHC. The receiving device performs decompression of the packet retransmissions. The receiving device discards duplicate packets after performing the decompression of the packet retransmissions.

18 Claims, 15 Drawing Sheets

(58) Field of Classification Search
USPC .......................................................... 455/72
See application file for complete search history.

(56) References Cited

U.S. PATENT DOCUMENTS

| | | |
|---|---|---|
| 10,341,466 B2 | 7/2019 | Raina et al. |
| 2012/0189023 A1 | 7/2012 | Huang et al. |
| 2019/0238661 A1 | 8/2019 | Raina et al. |
| 2019/0349822 A1* | 11/2019 | Kim ...................... H04W 36/08 |

FOREIGN PATENT DOCUMENTS

| | | |
|---|---|---|
| CN | 107635252 A | 1/2018 |
| CN | 108632229 A | 10/2018 |
| EP | 3217716 A1 | 9/2017 |
| WO | 2010017467 A1 | 2/2010 |

* cited by examiner

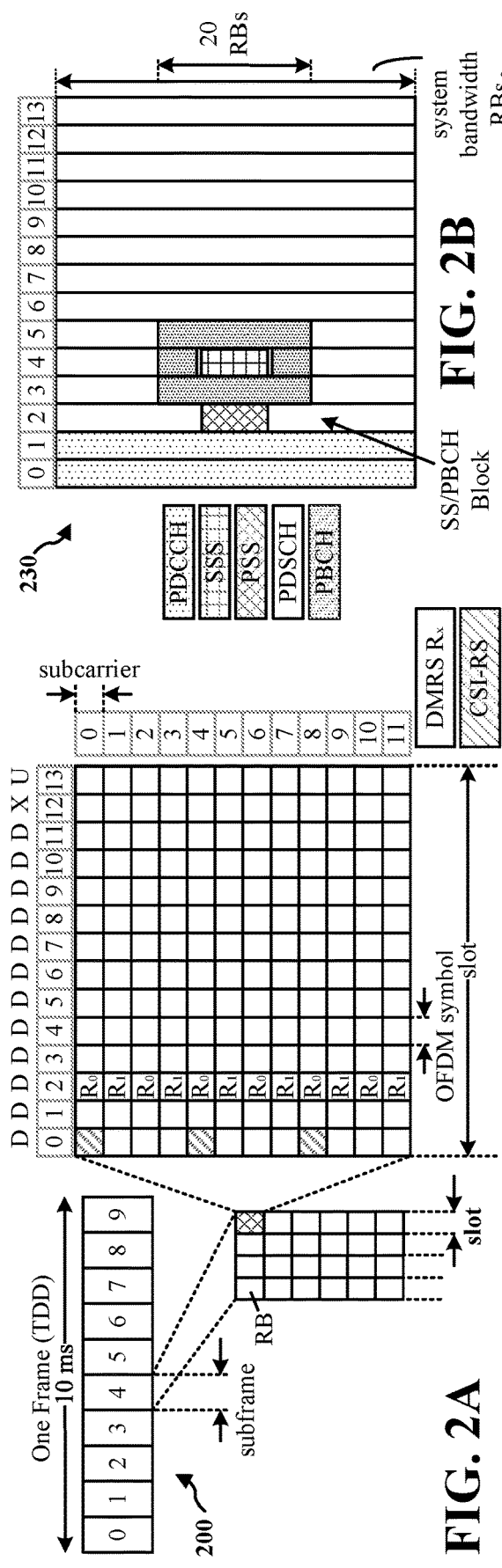
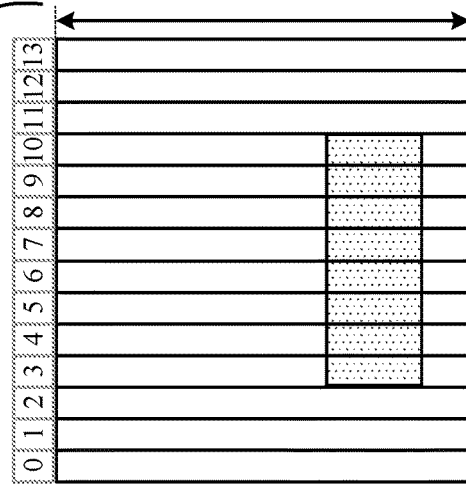
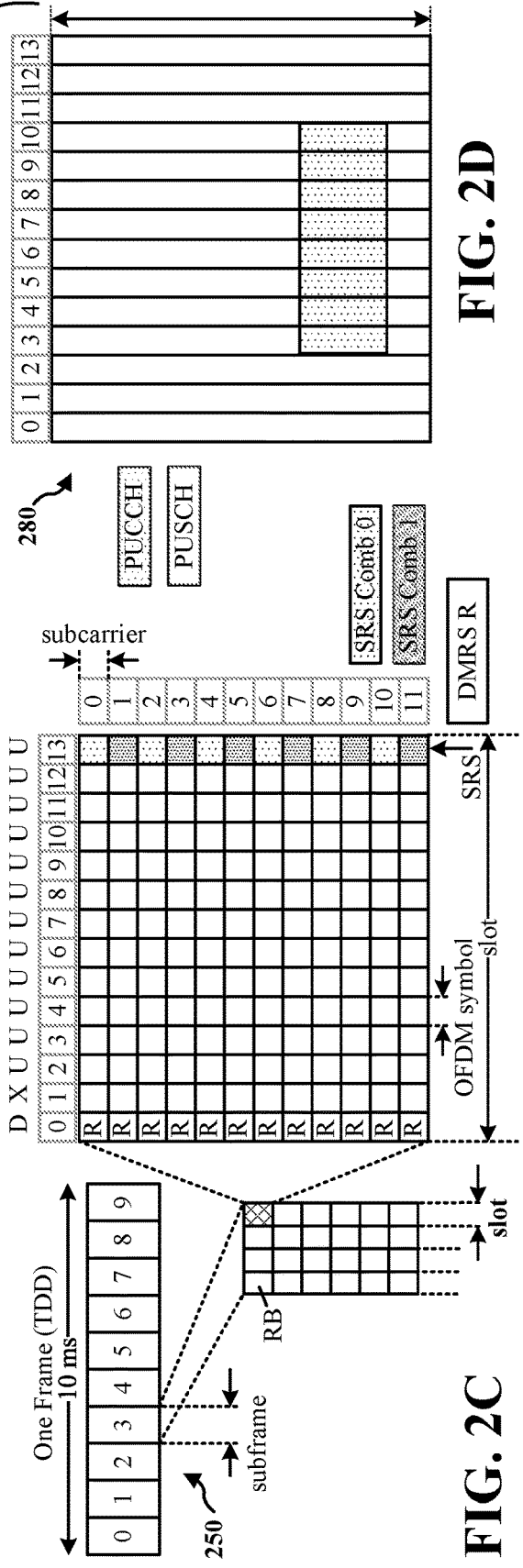
FIG. 2A  FIG. 2B  FIG. 2C  FIG. 2D

ROBUST HEADER COMPRESSION HANDLING DURING PACKET DATA CONVERGENCE PROTOCOL RE-ESTABLISHMENT

CROSS REFERENCE TO RELATED APPLICATIONS

This application is a 371 National Phase of PCT International Application No. PCT/CN2021/074414, entitled "ROBUST HEADER COMPRESSION HANDLING DURING PACKET DATA CONVERGENCE PROTOCOL RE-ESTABLISHMENT" and filed on Jan. 29, 2021, which claims the benefit of priority of U.S. Provisional Application Ser. No. 63/007,828, entitled "ROBUST HEADER COMPRESSION HANDLING DURING PACKET DATA CONVERGENCE PROTOCOL RE-ESTABLISHMENT" and filed on Apr. 9, 2020, which are expressly incorporated by reference herein in their entirety.

BACKGROUND

Technical Field

The present disclosure relates generally to communication systems, and more particularly, to wireless communication including robust header compression.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a receiving device. The apparatus re-establishes a packet data convergence protocol (PDCP) entity. The apparatus resets a robust header compression (ROHC) context. The apparatus receives packet retransmissions having header compression based on the ROHC. The apparatus performs decompression of the packet retransmissions. The apparatus discards duplicate packets after performing the decompression of the packet retransmissions.

In an aspect of the disclosure, a method, a computer-readable medium, and an apparatus are provided for wireless communication at a receiving device. The apparatus receives a plurality of packets based on a first ROHC context. The apparatus re-establishes a PDCP entity. The apparatus resets to a second ROHC context. The apparatus transmits a PDCP status report for the plurality of packets, wherein the PDCP status report indicates a negative acknowledgment (NACK) for each packet starting from a first lost packet.

In an aspect of the disclosure, a method, a computer-readable medium, and an apparatus are provided for wireless communication at a transmitting device. The apparatus transmits a plurality of packets based on a first ROHC context. The apparatus receives an RLC acknowledgement (ACK) for successfully received packets from the plurality of packets based on the first ROHC context. The apparatus re-establishes a PDCP entity. The apparatus resets to a second ROHC context. The apparatus receives a PDCP status report for the plurality of packets, wherein the PDCP status report indicates a NACK for each packet starting from a first lost packet.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
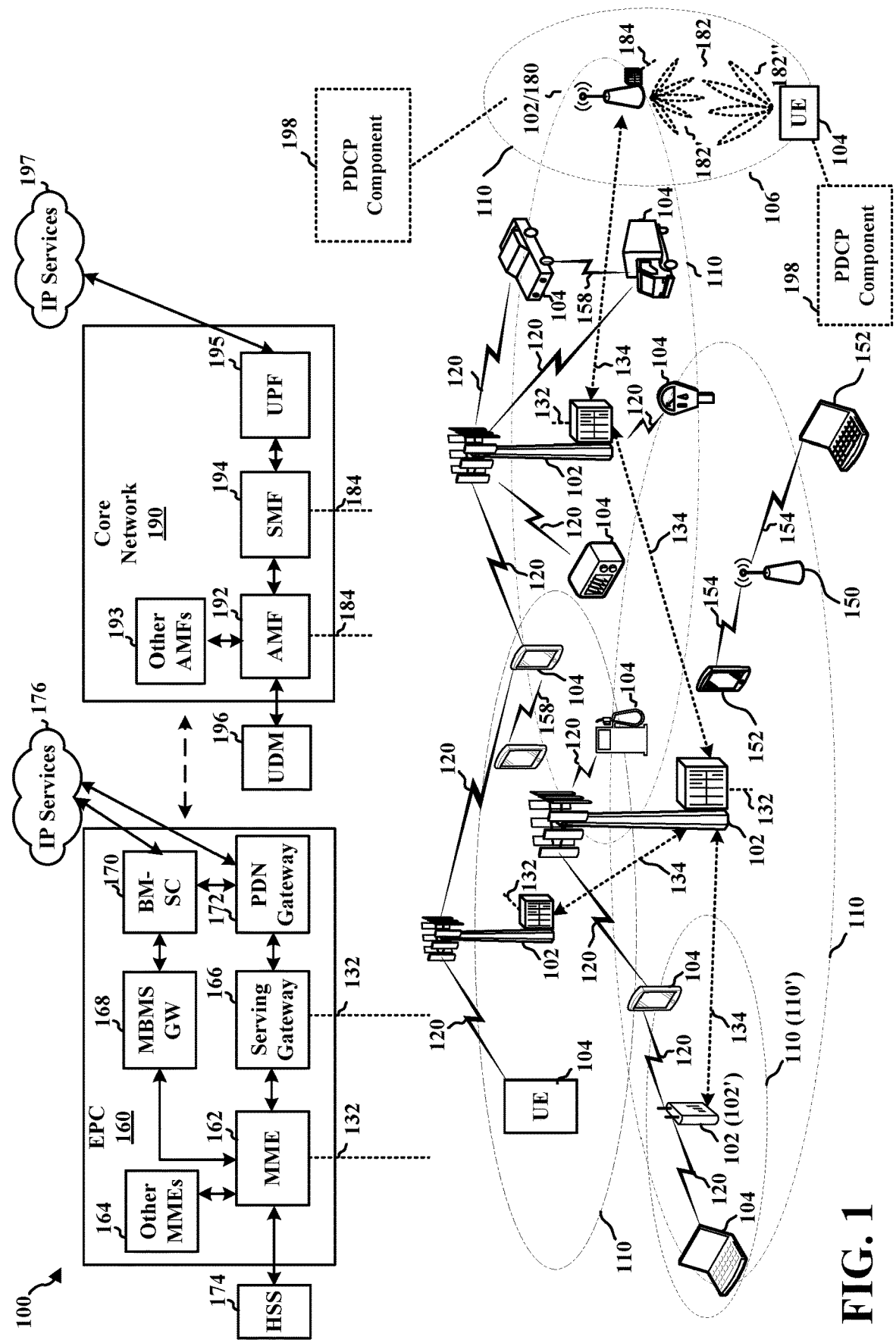
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

During a handover procedure for a UE to switch from one base station to another base station, and/or during a radio link failure (RLF) re-establishment between a UE and a base station, the UE and the base station may be configured to perform PDCP re-establishment. Some duplicate PDCP packets may be discarded by a receiving PDCP entity during and/or after the PDCP re-establishment, which may appear as losses to an ROHC decompressor of the receiving PDCP entity which may affect compression efficiency of the ROHC decompressor. Additionally, when a receiving PDCP entity processes stored PDCP SDUs that are out of order before an ROHC reset, some of the out of order PDCP SDUs may appear as losses to an ROHC decompressor, which may affect synchronization between the receiving PDCP entity and a corresponding transmitting PDCP entity. Aspects presented herein may improve the efficiency of ROHC compression and decompression for a transmitting PDCP entity and a receiving PDCP entity, such as during a PDCP re-establishment. Aspects presented herein may reduce PDCP packets that may appear as losses to an ROHC decompressor, and may also reduce PDCP packets processed by an ROHC compressor.

FIG. 1 is a diagram illustrating an example of a wireless communications system and an access network 100. In certain aspects, the base station 102 or 180 and/or the UE 104 may include a PDCP component 198 configured to change the processing order of ROHC header decompression and duplicate PDCP packets discarding, such as during a PDCP re-establishment. For example, the UE 104 or the base station 102 or 180 may re-establish a PDCP entity, reset a ROHC context, and receive packet retransmissions having header compression based on the ROHC. The PDCP component may be configured to perform decompression of the packet retransmissions and discard duplicate packets after performing the decompression of the packet retransmissions.

Alternatively, the PDCP component 198 may also be configured not to decompress any PDCP packets that are out of order, and send a PDCP status report with NACK feedback for PDCP packets that are missing and/or out of order. Aspects present herein may improve the efficiency of ROHC operations. For example, the PDCP component 198 may be configured to receive a plurality of packets based on a first ROHC context. After re-establishing a PDCP entity and resetting to a second ROHC context, the PDCP component 198 may be configured to transmit a PDCP status report for the plurality of packets, where the PDCP status report indicates a NACK for each packet starting from a first lost packet.

As a transmitter, the UE 104 or the base station 102 or 180 may transmit a plurality of packets based on a first ROHC context and may receive an RLC ACK for successfully received packets from the plurality of packets based on the first ROHC context. After re-establishing a PDCP entity and resetting to a second ROHC context, the PDCP component 198 may be configured to receive a PDCP status report for the plurality of packets that indicates a NACK for each packet starting from a first lost packet. In some examples, the PDCP status report may indicate a NACK for packets for which the transmitter previously received the RLC ACK. The PDCP component 198 may be configured to transmit a retransmission of each packet starting from the first lost packet based on the second ROHC context.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., 51 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronic s Engineers (IEEE) 602.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency (RF) band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
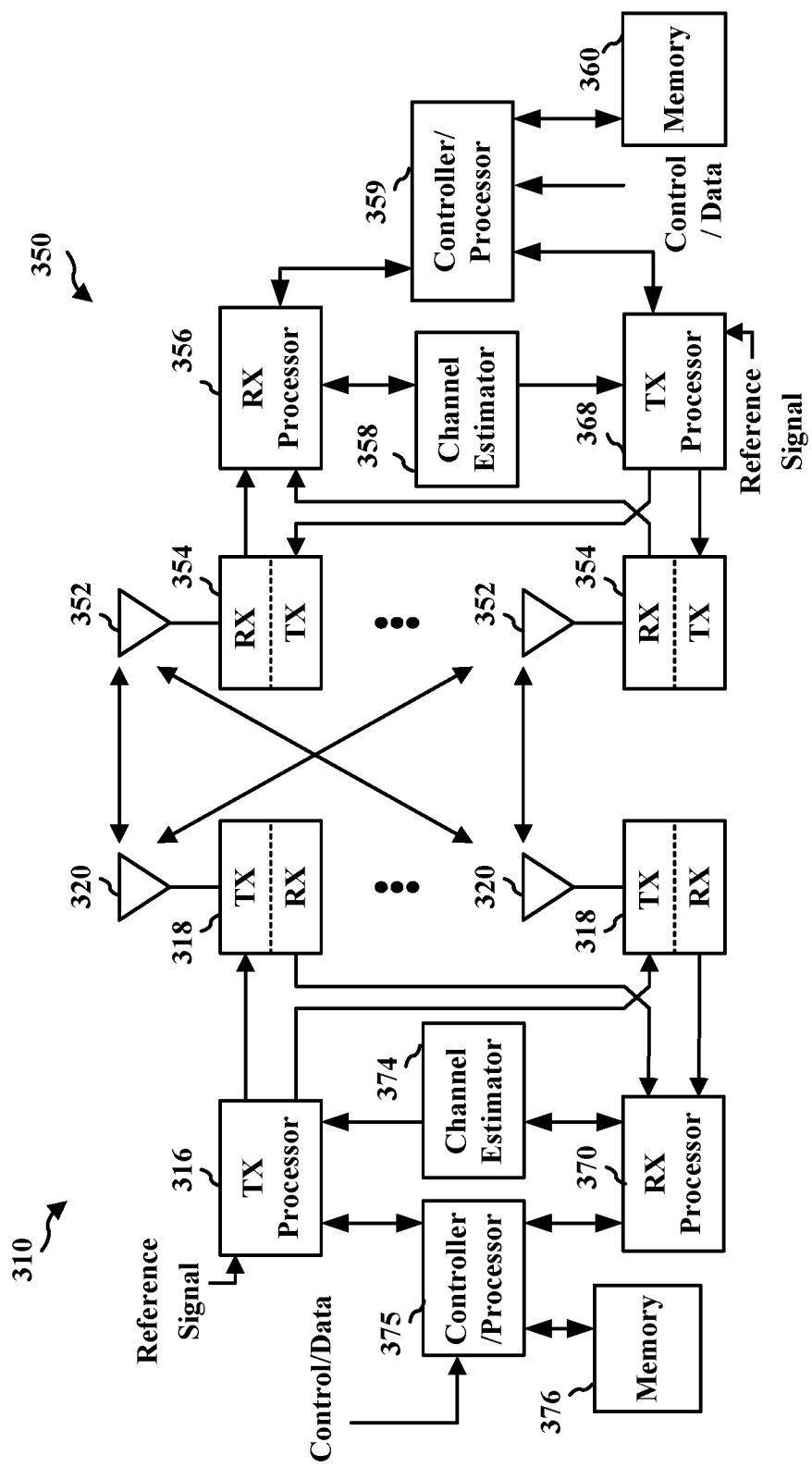
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 1198 of FIG. 1. least one of the TX processor 316, the RX processor 370, and the controller/processor 375 may be configured to perform aspects in connection with 198 of FIG. 1.

In some networks, a radio link control (RLC) layer may perform framing of RLC service data units (SDUs) to put the SDUs into the size indicated by a lower medium access control (MAC) layer. An RLC transmitter may segment RLC SDUs to construct RLC protocol data units (PDUs), and an RLC receiver may reassemble the RLC PDUs to reconstruct the RLC SDUs. These RLC functions may be performed by an RLC entity, and the RLC entity may be established when a radio bearer is being set up, and the RLC entity may be removed when the associated radio bearer is released. When an RLC entity is established, the RLC entity may be configured in one of at least three operating modes: a transparent mode (TM), an unacknowledged mode (UM), and an acknowledged mode (AM). Under the RLC TM, an RLC TM entity in RLC may not add any overhead to the upper layer SDUs, and the RLC TM entity may transmit the SDUs coming from upper layer to the MAC layer. Under the RLC UM, an RLC UM entity may be used for transmission of delay sensitive packets, such as VoIP packets or audio/video streams. Under the RLC AM, an RLC AM entity may be used for both user plane and control plane packets, and may have PDCP as the upper layer. SDUs coming to the RLC AM entity may be security protected. In some examples, the RLC AM may support HARQ feedback mechanism to retransmit lost PDUs, and the RLC AM entity may also support segmentation.

When a radio bearer is established with an RLC AM entity or an RLC UM entity, an RLC AM radio bearer and/or an RLC UM radio bearer may be configured to support robust header compression (ROHC) which may be used for compressing the header of IP packets. The ROHC may be associated with a packet data convergence protocol (PDCP), where the PDCP may provide the ROHC with data to be compressed/decompressed and handle the output data. In addition, the ROHC may include various modes of operations, such as a unidirectional mode (U-mode), a bidirectional optimistic mode (O-mode) and/or a bidirectional reliable mode (R-mode), etc. For example, under the U-mode, packets may be transmitted in one direction (e.g., from compressor to decompressor). The O-mode may be similar to the U-mode, but a feedback channel may be used by a decompressor to send error recovery requests (e.g., for decompression failure) and/or acknowledgments (e.g., for successful context update). Under the R-mode, a compressor and a decompressor context may be synchronized, where the compressor may send the context updating packets repeatedly until a feedback (e.g., an acknowledgement) is received from the decompressor. A compressor may have different compressor states, such as an initialization and refresh (IR) state, a first order state, and a second order state, etc. For the ROHC, information related to past packets may be maintained in a context, and the context may then be used by a compressor or a decompressor to compress and/or decompress subsequent packets. If there are inconsistencies between the contexts of the compressor and the decompressor, the decompression may fail. In some examples, the ROHC compression may start in an IR state, where IR packets may be transmitted to initialize a new context at the decompressor. The IR packets may be packets with a full header.

During a handover procedure, where a UE switches its connection from one base station to another base station, and/or during a radio link failure (RLF) re-establishment, a transmitting entity and/or a receiving entity of the UE/base station may perform PDCP re-establishment. In some examples, one or more parameters associated with the ROHC during the PDCP re-establishment may be configured through system parameter(s), such as parameters related to whether an ROHC context gets continued across the handover or gets reset after the handover. For example, the network may configure a parameter (e.g., a DRB-ContinueROHC parameter) that may enable a receiver and/or a transmitter to continue use an ROHC context. In other examples, the parameter may indicate that the ROHC context used by a UE with a previous base station (e.g., before handover) or before the RLF may continue to be used by the UE after the PDCP re-establishment. On the other hand, if the network does not configure this parameter or the parameter is not enabled for a UE, the ROHC context may be reset after the handover or the RLF. For example, after a PDCP re-establishment and in an uplink transmission without continued ROHC context configured (or enabled), a UE may reset the ROHC context and start with an IR state under the U-mode. This means that the UE may start with sending packets (e.g., PDUs) with uncompressed headers, and then the UE may start retransmitting packets that are not RLC acknowledged (e.g., RLC unacknowledged PDUs). The UE may be configured to perform ROHC again for these retransmitted packets using a new ROHC context after the reset. In other example, after a PDCP re-establishment and in a downlink transmission without continued ROHC context configured (or enabled), the UE may have some SDUs stored which are waiting for re-ordering. The UE may start with performing ROHC header decompression for the stored SDUs, following by the ROHC reset, and the UE may start with a no-context (NC) state in the U-mode. Afterwards, any packets (e.g., PDCP packets) received by the UE may be decompressed according to the new ROHC context that has been reset.

As an example, the overall sequence for ROHC during a PDCP re-establishment may include the following. First, a receiver (e.g., a receiving PDCP entity) may decompress stored packets (e.g., stored PDCP SDUs). Then, both a transmitter (e.g., a transmitting PDCP entity) and the receiver may reset the ROHC context. Then, the transmitter may retransmit packets starting from a first RLC unacknowledged packet after the ROHC is performed according to the new ROHC context. In addition, the retransmitted packets may also depend on a PDCP status report sent by the receiver. The ROHC compression may be performed for each of the RLC unacknowledged packets. After receiving the retransmissions, the receiver may discard duplicate retransmissions and perform ROHC decompression for the remaining retransmissions (e.g., unduplicated ones).

Figure 4:
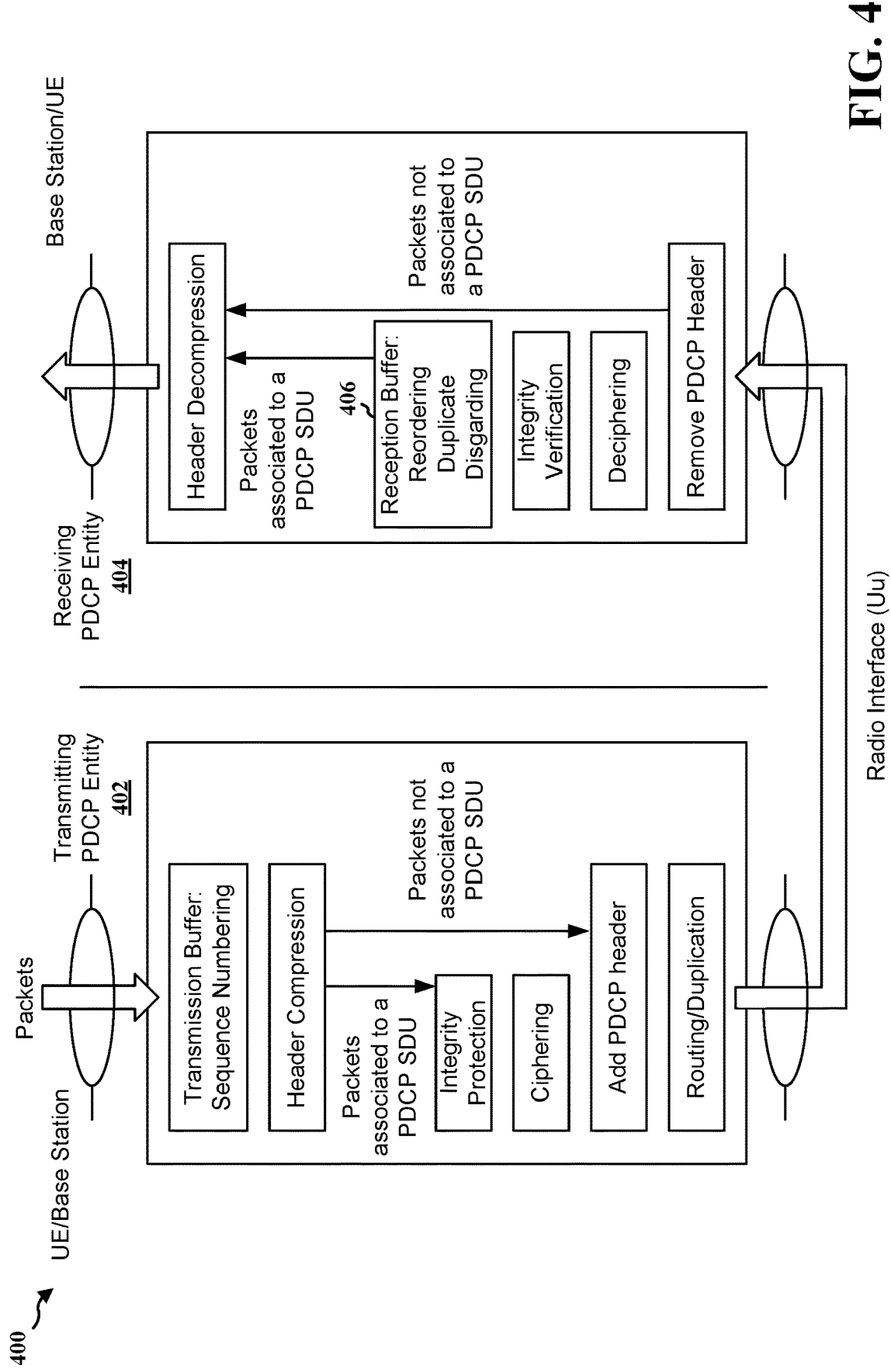
FIG. 4 is a diagram illustrating an example of PDCP architecture.

FIG. 4 is a diagram 400 illustrating an example of PDCP architecture between a transmitting PDCP entity 402 (e.g., transmitter side) and a receiving PDCP entity 404 (e.g., receiver side). A UE and/or a base station may be associated with both the transmitting PDCP entity 402 and the receiving PDCP entity 404. In one example, as shown by FIG. 4, packets (e.g., data blocks) coming into the transmitting PDCP entity 402 may first go through sequence numbering, where the transmitting PDCP entity 402 may add a sequence number (SN) for each incoming packet. Then, the receiving PDCP entity 404 may use the SN of the packets to identify whether one or more packets transmitted by the transmitting PDCP entity 402 are complete, are in a correct order and/or are missing, etc. After the sequence numbering, the packets may go through header compression. In some examples, header compression may apply to IP packet data but not signaling messages. Then, the transmitting PDCP entity 402 may apply integrity protection to the compressed packets (e.g., packets associated to a PDCP SDU) and/or cipher the compressed packets. After that, the transmitting PDCP entity 402 may add a PDCP header to the compressed packets, and the transmitting PDCP entity 402 may transmit the compressed packets with the PDCP header to the receiving PDCP entity 404 (e.g., via a Uu radio interface).

After the receiving PDCP entity 404 receives the compressed packets with the PDCP header from the transmitting PDCP entity 402, the receiving PDCP entity 404 may remove the PDCP header from the packets, decipher the packets, and/or verify the integrity of the packets. As shown at 406, the receiving PDCP entity 404 may reorder the packets (e.g., based on their SN) and discard any duplicate packet(s), and then the rest of the packets may go through header decompression.

Figure 5:
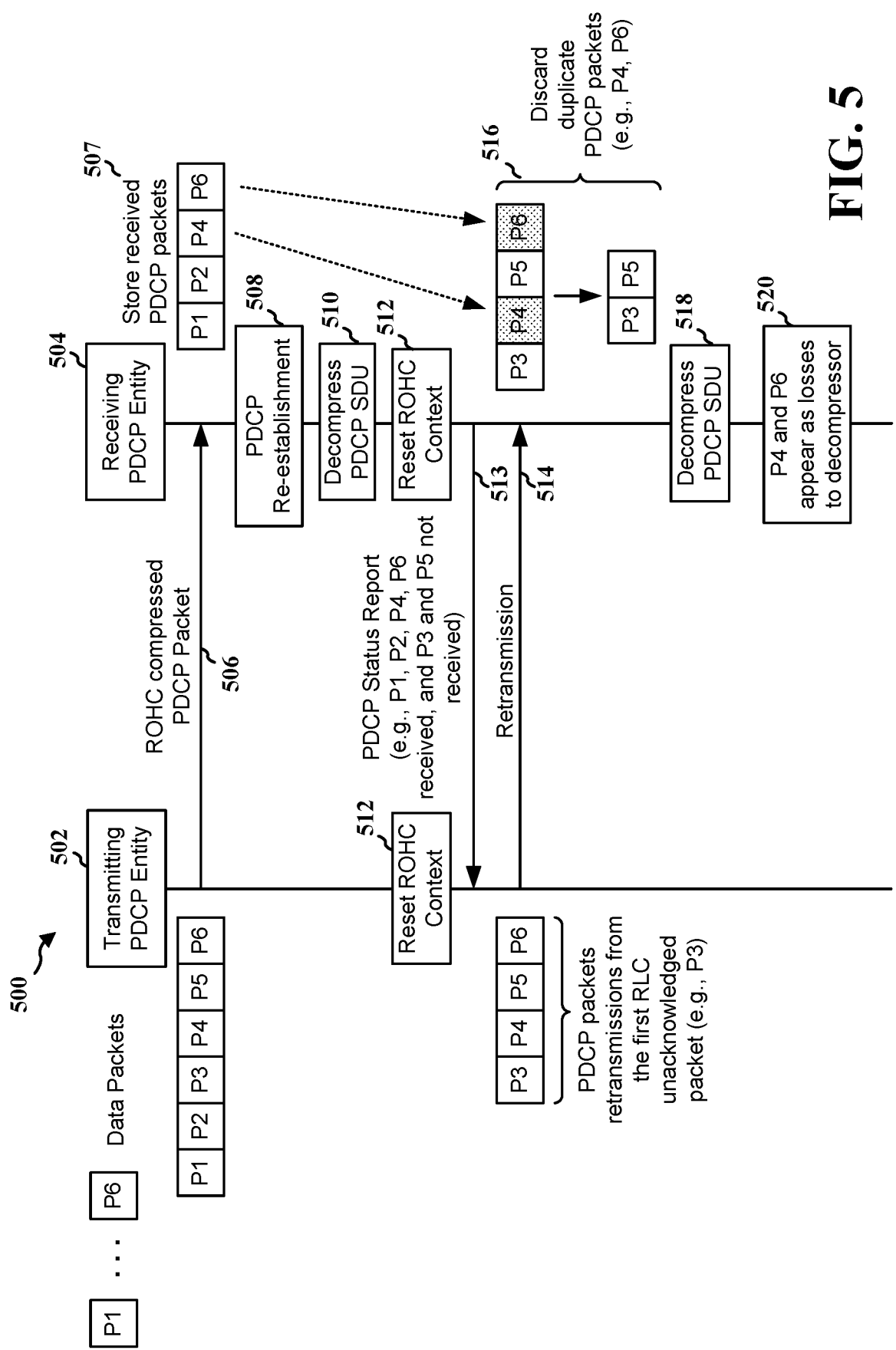
FIG. 5 is an example communication flow between a transmitting PDCP entity and a receiving PDCP entity.

FIG. 5 is a communication flow 500 illustrating an example of a data retransmission procedure for a PDCP architecture, such as described in connection with FIG. 4. In one example, at 506, a transmitting PDCP entity 502 may send ROHC compressed PDCP packets P1, P2, P3, P4, P5 and P6 (e.g., PDCP SDUs) to a receiving PDCP entity 504 using a first ROHC context. However, the receiving PDCP entity 504 may receive PDCP packets P1, P2, P4 and P6, and may not have received PDCP packets P3 and P5, which may be lost during the transmission at 506 (e.g., during a handover procedure). As shown at 507, the receiving PDCP entity 504 may store the received PDCP packets P1, P2, P4 and P6 at the receiving PDCP entity 504. Then, at 508, the receiving PDCP entity 504 may initiate a PDCP re-establishment procedure.

At 510, after the PDCP re-establishment procedure is initiated, the receiving PDCP entity 504 may first decompress the stored PDCP packets, such as the PDCP packets P1, P2, P4 and P6. As PDCP packets P3 and P5 are not received by the receiving PDCP entity 504, PDCP packets P3 and P5 may appear as losses to a ROHC decompressor of the receiving PDCP entity 504. The ROHC decompressor may be able to decompress PDCP packets successfully if a few PDCP packets are missing. However, as a number of missing PDCP packets becomes higher, the decompression may become more likely to fail.

At 512, after the receiving PDCP entity 504 decompresses the stored PDCP packets, both the transmitting PDCP entity 502 and the receiving PDCP entity 504 may reset their ROHC context. At 513, the receiving PDCP entity 504 may send a PDCP status report to the transmitting PDCP entity 502. The PDCP status report may include an indication of successfully delivered PDCP packets as each PDCP packet may be associated with an SN, and the PDCP status report may also indicate the SN of a first missing PDCP packet (e.g., a first RLC unacknowledged packet, the PDCP packet P3) and a bitmap indicating subsequent SNs of PDCP packets that are successfully received (e.g., PDCP packets P4 and P6) after the first missing PDCP packet (e.g., the PDCP packet P3).

At 514, in response to the PDCP status report, the transmitting PDCP entity 502 may retransmit PDCP packets from the first RLC unacknowledged (e.g., the first missing packet P3) to the receiving PDCP entity 504 after header compression using a new ROHC context (e.g., a second ROHC context). For example, at 514, the transmitting PDCP entity 502 may retransmit PDCP packets P3, P4, P5 and P6 to the receiving PDCP entity after applying header compression to the PDCP packets P3, P4, P5 and P6 using the new ROHC context.

As PDCP packets P4 and P6 were received by the receiving PDCP entity 504 before the PDCP re-establishment at 508, the receiving PDCP entity 504 may consider PDCP packets P4 and P6 received in the retransmission at 514 as duplicates. As such, as shown at 516, the receiving PDCP entity 504 may automatically discard the duplicated PDCP packets P4 and P6.

At 518, the receiving PDCP entity 504 may decompress the rest of the PDCP packets (e.g., PDCP packets P3 and P5) via a ROHC decompressor. In some examples, as shown at 520, after the receiving PDCP entity 504 decompresses the rest of the PDCP packets, PDCP packets P4 and P6 that are retransmitted at 514 may appear as losses to the ROHC decompressor as they are being discarded as duplicates at 516.

As shown by FIG. 5, there may be two sets of PDCP packets which may appear as losses to the ROHC decompressor at the receiving PDCP entity 504, where one loss may occur before the ROHC context reset at 512 (e.g., PDCP packets P3 and P5—these missing PDCP packets may be referred as PDCP holes), and another loss may occur after the ROHC context reset or the PDCP re-establishment at duplicate PDCP packet discarding process (e.g., the discarding of duplicate PDCP packets P4 and P6 at 516). In some examples, as the discarded duplicate PDCP packets after the PDCP re-establishment may appear as losses to the ROHC decompressor, it may affect the efficiency of the ROHC compression performed by the ROHC decompressor. In other examples, after the PDCP re-establishment, as both the transmitting PDCP entity 502 and the receiving PDCP entity 504 may be reset, both of them may be sending IR packets (e.g., packets with full header). While IR packets may still be decoded if previous packets are lost, if a number of duplicate packets (e.g., P4, P6) exceeds the number of IR packets, the ROHC may lose its context.

In other words, during an uplink PDCP re-establishment of ROHC bearer, such as ROHC bearer with profile 6 enabled (e.g., ROHC profile 0x6), a transmitting PDCP entity may retransmit PDCP packets that are not received by a receiving PDCP entity starting with the first missing PDCP packet with sequence numbering (SN) X to SN (X+Y), where Y may be a larger number. For some networks, during the PDCP entity re-establishment, ROHC handling at a receiving PDCP entity may be reset and the transmitting PDCP entity may compress retransmitted PDCP packets starting from retransmitted PDCP packets with SN X (e.g., with profile 6). In some examples, a first few packets of the retransmitted PDCP packets may be ROHC IR packets, e.g., PDCP packets SN X to X+num_ir (number of IR packets), and the rest of the retransmitted PDCP packets may be compressed (CO) packets. In such examples, a receiving PDCP entity may transmit a PDCP status report with a first missing count (FMC) equal to X+Z, where num_ir may be smaller than Z and Z may be smaller than Y (e.g., num_ir<Z<Y), which means any PDCP PDU(s) with SN smaller than X+Z (e.g., SN<X+Z) may be duplicated PDU that may be dropped in PDCP. Thus, decompression may fail for new packets after the PDCP re-establishment as the ROHC decompressor handle is reset and the received packets are not IR packets. In one example, a transmitting PDCP entity may overcome this by resetting the ROHC handle upon reception of PDCP status report that discards too many IR packets (e.g., discarding a number of IR packets above a threshold), and compressing with both the remaining PDCP retransmissions and new PDCP transmissions (PDCP NEWTX) with profile 6 again. However, as the number of packets to be compressed may be large, it may result in a long process time for the transmitting entity.

In one aspect of the present disclosure, to avoid or to reduce the aforementioned scenario, during an uplink PDCP re-establishment of ROHC bearer with profile 6 enabled, a transmitting PDCP entity may reset ROHC handle and compress retransmitted PDCP packets with SN X to SN (X+Y) with profile 0 (e.g., ROHC profile 0x0 or 0x0000) instead of profile 6 while compressing new PDCP packets with profile 6. As such, the first num_it packets of both PDCP retransmissions and new transmissions are IR packets. Then, the receiving PDCP entity may transmit a PDCP status report to the transmitting PDCP entity with an FMC equals to X+Z, where Z may be smaller than Y (e.g., Z<Y) as the receiving PDCP entity may not acknowledge PDU that is not transmitted by the transmitting PDCP entity. In response, the transmitting PDCP entity may discard the acknowledged PDUs in the PDCP status report and reset ROHC compress handle, and the transmitting PDCP entity may compress PDCP retransmissions starting from (X+Z) to the last PDCP retransmission with profile 0. In some examples, the first packets may be IR packets and may be delivered to the ROHC decompressor of the receiving PDCP entity by PDCP as they are not duplicated packets. As such, the number of packets to be compressed by the transmitting PDCP entity may be limited in a PDCP packet retransmission, which may be much less than processing PDCP retransmissions with new transmissions. In addition, compression of profile 0 may be much faster than compression of profile 6. While the example is illustrated with the ROHC profile 6, aspects presented herein may apply to other ROHC profiles, such as ROHC profiles 1, 2, 3, 4, 5, etc. as well.

In some examples, a receiving PDCP entity may not transmit a PDCP status report to a transmitting PDCP entity. In such examples, when a PDCP re-establishment is performed between the receiving PDCP entity and the transmitting PDCP entity, the transmitting PDCP entity may be configured to compress packets with ROHC profile 0 so that the receiving PDCP entity may not have a problem even if duplicate packets are discarded by the receiving PDCP entity. For example, when the transmitting PDCP entity retransmits PDCP packets with SN X to SN X+Y to the receiving PDCP entity, the first missing packet at the receiving PDCP entity may be X+Z (e.g., Z<Y) even though no PDCP status report is transmitted by the receiving PDCP entity. Then, the receiving PDCP entity may start decompressing PDCP packets from SN X+Z and onwards. As such, if ROHC profile 0 is used, there may be no decompression loss at the receiving PDCP entity.

Based upon the foregoing, aspects presented herein may improve the efficiency of an ROHC operation, such as during a PDCP re-establishment for RLC AM. Aspects presented herein may enable a receiving PDCP entity to discard duplicate PDCP packets after decompression, such that the duplicate PDCP packets discarded by the receiving PDCP entity may not appear as losses to a ROHC decompressor. In one aspect of the present disclosure, as shown by diagram 600 of FIG. 6, after the PDCP is re-established between a transmitting PDCP entity 602 and a receiving PDCP entity 604, the receiving PDCP entity 604 may discard duplicate PDCP packets after header decompression, such as shown at 606. This may enable duplicate PDCP packets to be processed during or after the ROHC decompression, and the retransmitted PDCP packets at the receiving PDCP entity 604 may follow the same PDCP packet order (e.g., P3, P4, P5, P6 in FIG. 5) that was followed at the transmitting PDCP entity 602 after the ROHC reset, such as described in connection with 512 of FIG. 5. The discarding of duplicate PDCP packets after the ROHC decompression may be configured to be a function that is enabled by the receiving PDCP entity 604, such as during a PDCP re-establishment, and may be disabled by the receiving PDCP entity 604 after the PDCP re-establishment. If the function is disabled, the duplicate PDCP packets may be discarded before decompression, such as described in connection with FIGS. 4 and 5.

Figure 6:
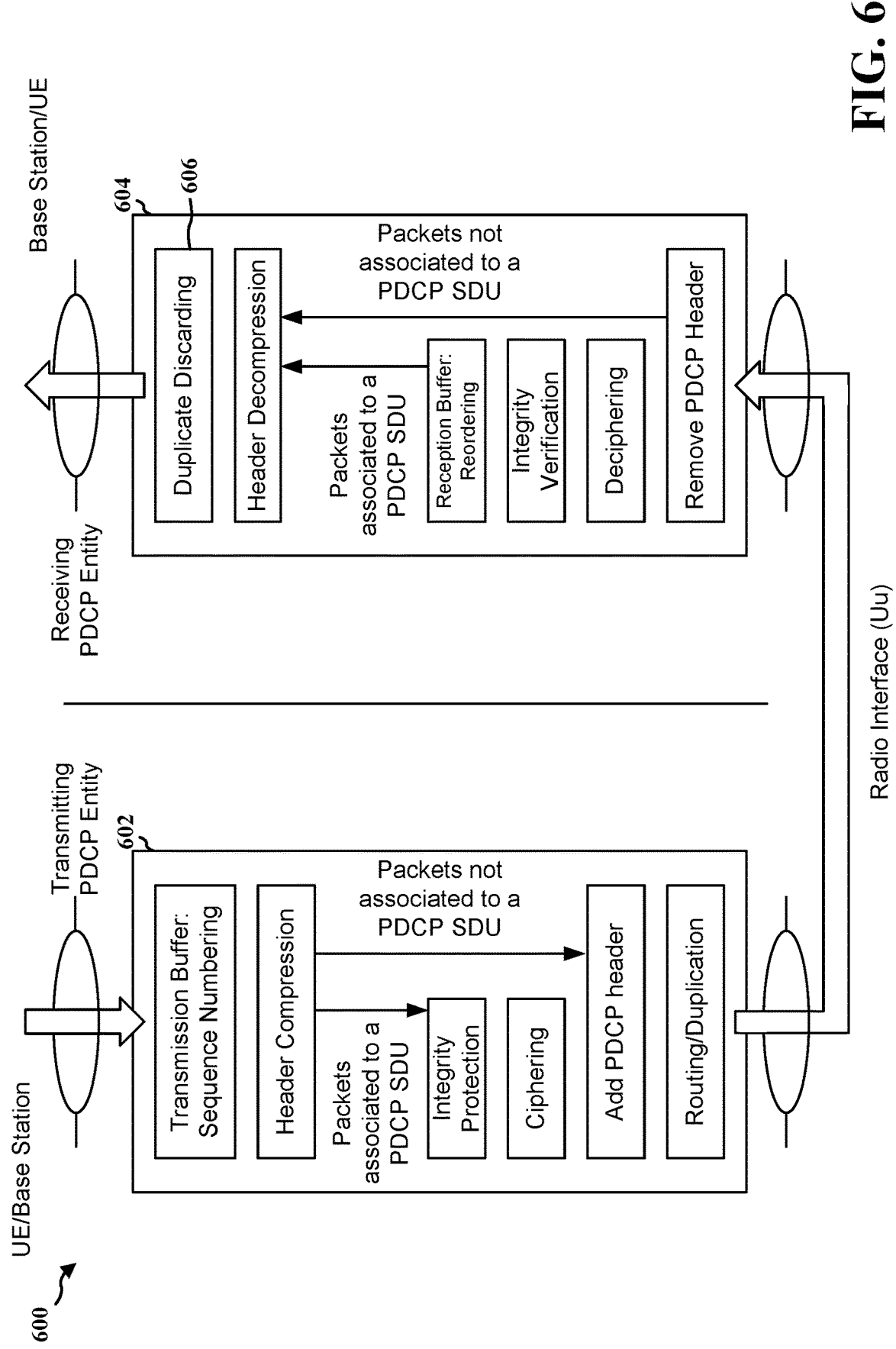
FIG. 6 is a diagram illustrating an example of PDCP architecture.
Figure 7:
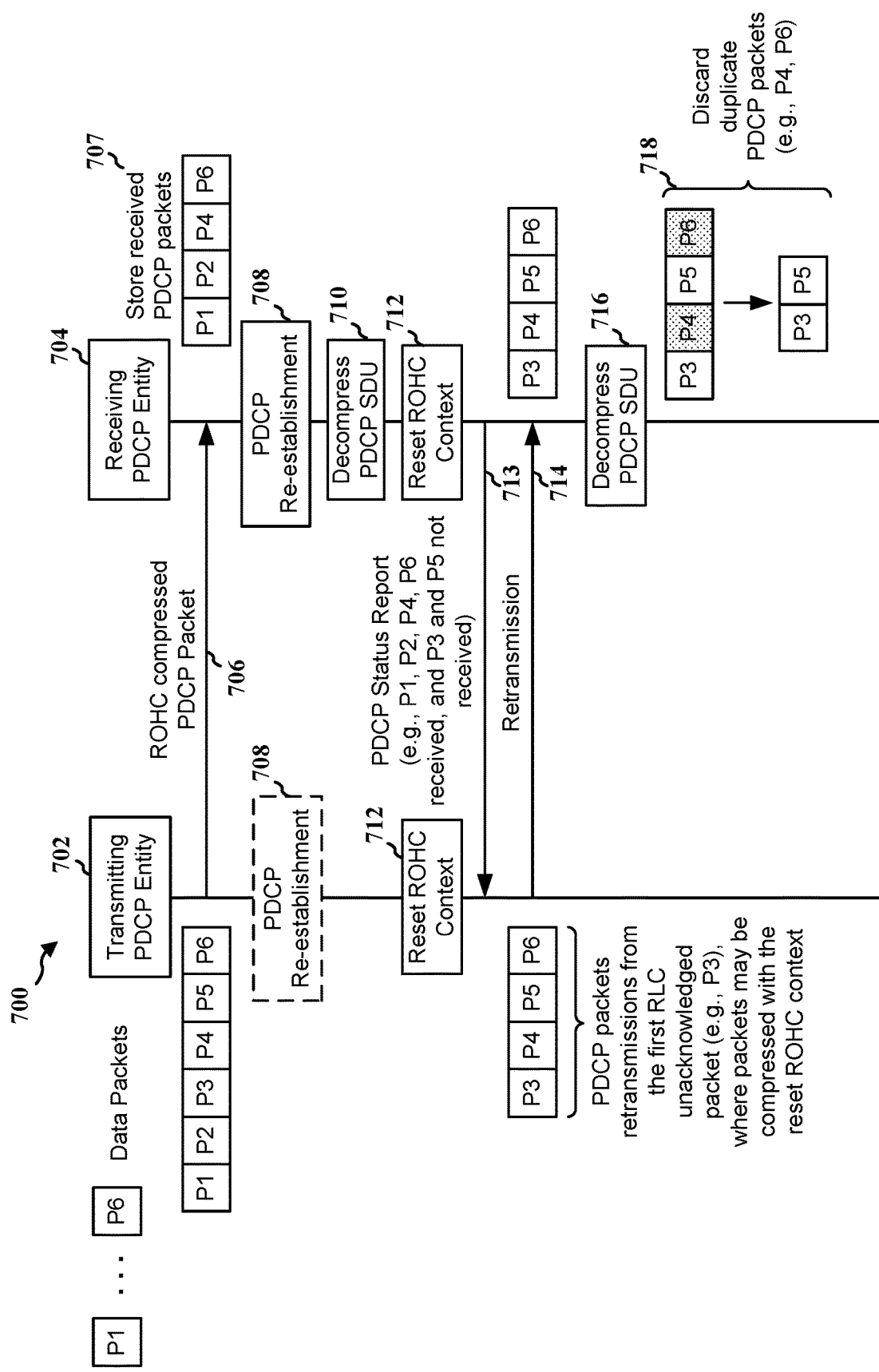
FIG. 7 is an example communication flow between a transmitting PDCP entity and a receiving PDCP entity according to aspects of the present disclosure.

FIG. 7 is a communication flow 700 illustrating an example of a data retransmission procedure for the PDCP architecture described in connection with FIG. 6 according to aspects of the present disclosure. In one example, at 706, a transmitting PDCP entity 702 may send ROHC compressed PDCP packets P1, P2, P3, P4, P5 and P6 (e.g., PDCP SDUs) to a receiving PDCP entity 704 using a first ROHC context. However, the receiving PDCP entity 704 may receive PDCP packets P1, P2, P4 and P6, and may not have received PDCP packets P3 and P5, which may be lost during the transmission at 706 (e.g., during a handover procedure). As shown at 707, the receiving PDCP entity 704 may store the received PDCP packets P1, P2, P4 and P6 at the receiving PDCP entity 704. In some examples, the receiving PDCP entity 704 may receive one or more PDCP packets based on a first ROHC profile. For example, an uplink (UL) PDCP re-establishment of an ROHC bearer with profile 6 may be enabled. Thus, the first ROHC profile may be profile 6. Then, at 708, the receiving PDCP entity 704 and/or the transmitting PDCP entity 702 may initiate a PDCP re-establishment procedure.

At 710, after the PDCP re-establishment procedure is initiated, the receiving PDCP entity 704 may first decompress the stored PDCP packets, such as the PDCP packets P1, P2, P4 and P6. As PDCP packets P3 and P5 are not received by the receiving PDCP entity 704, PDCP packets P3 and P5 may appear as losses to a ROHC decompressor of the receiving PDCP entity 704.

At 712, after the receiving PDCP entity 704 decompresses the stored PDCP packets, both the transmitting PDCP entity 702 and the receiving PDCP entity 704 may reset their ROHC context. At 713, the receiving PDCP entity 704 may send a PDCP status report to the transmitting PDCP entity 702. The PDCP status report may include an indication of successfully delivered PDCP packets as each PDCP packet may be associated with an SN, and the PDCP status report may also indicate the SN of a first missing PDCP packet (e.g., a first RLC unacknowledged packet, the PDCP packet P3) and a bitmap indicating subsequent SNs of PDCP packets that are successfully received (e.g., PDCP packets P4 and P6) after the first missing PDCP packet (e.g., the PDCP packet P3).

At 714, in response to the PDCP status report, the transmitting PDCP entity 702 may retransmit PDCP packets from the first RLC unacknowledged (e.g., the first missing packet P3) to the receiving PDCP entity 704 after header compression using a new ROHC context (e.g., a second ROHC context). For example, at 714, the transmitting PDCP entity 702 may retransmit PDCP packets P3, P4, P5 and P6 to the receiving PDCP entity after applying header compression to the PDCP packets P3, P4, P5 and P6 using the new ROHC context.

At 716, after receiving the PDCP packets retransmission from the transmitting PDCP entity 702, the receiving PDCP entity 704 may perform ROHC header decompression (e.g., 608 in FIG. 6) for the retransmitted PDCP packets received (e.g., PDCP packets P3, P4, P5 and P6). The decompression at 716 may include decompressing duplicate PDCP packets (e.g., PDCP packets P4 and P6).

At 718, after the receiving PDCP entity decompresses the retransmitted PDCP packets received, the receiving PDCP entity 704 may discard duplicate PDCP packets. For example, duplicate PDCP packets P4 and P6 may be discarded at 718, such as shown at 606 of FIG. 6. In one example, the receiving PDCP entity 704 may determine which PDCP packets are duplicate based on the PDCP status report.

In some examples, a receiving PDCP entity (e.g., a UE or a base station) may be configured with the function/capability to change the order of discarding the duplicate PDCP packets (e.g., from before decompression to after decompression), such as during a PDCP re-establishment procedure. For example, if the function/capability is enabled by the receiving PDCP entity, the receiving PDCP entity may discard the duplicate PDCP packets after the decompression, whereas if the function/capability is disabled by the receiving PDCP entity, the receiving PDCP entity may discard the duplicate PDCP packets before the decompression. In some examples, the function/capability to change the order of discarding the duplicate PDCP packets (hereafter as the "change discarding order function") may be disabled (or reverted) by the receiving PDCP entity after one or more triggering events and/or under defined condition(s).

In one example, a receiving PDCP entity may enable the change discarding order function during a PDCP re-establishment, and the receiving PDCP entity may continue to enable the change discarding order function (e.g., to discard duplicate PDCP packets after decompression) until the last missing PDCP packet of PDCP packet(s) that are lost before the PDCP re-establishment is filled, such as when the missing PDCP packets P3 and P5 shown in FIG. 7 are filled. After the last missing PDCP packet is filled, the receiving PDCP entity may be configured to disable the change discarding order function (i.e., duplicate PDCP packets may again be discarded before decompression).

In another example, the receiving PDCP entity may enable the change discarding order function if a duplicate PDCP packet is for a PDCP packet received before PDCP re-establishment (e.g., PDCP packets P3 and P5 in FIG. 7). As the receiving PDCP entity may continue to receive duplicate PDCP packets, if the duplicate PDCP packet no longer contain PDCP packet received before PDCP re-establishment, the receiving PDCP entity may disable the change discarding order function.

In another example, the receiving PDCP entity may enable the change discarding order function for a defined period of time, such as based on a timer. Once the defined period of time is reached, such as when the timer expires, the receiving PDCP entity may disable the change discarding order function.

In another example, the receiving PDCP entity may enable the change discarding order function until the ROHC decompressor informs the PDCP receiving entity that it has a valid ROHC context. Then, the receiving PDCP entity may disable the change discarding order function.

As described in connection with FIG. 5, there may be two sets of PDCP packets that may appear as losses to the ROHC decompressor, where the first loss may occur before the ROHC reset and the second loss may occur after the ROHC reset or the PDCP re-establishment. For example, referring back to FIG. 5, after the PDCP re-establishment is initiated at 508, the receiving PDCP entity 504 may decompress the stored PDCP SDUs at 510 without waiting for missing PDCP packets P3 and P5 (e.g., PDCP holes) to be filled. These missing PDCP holes may appear as losses to the ROHC decompressor during the decompression. In some examples, the ROHC decompressor may still be able to decompress PDCP packets successfully if some or few PDCP packets are lost. However, if a number of missing packets exceeds a limit or becomes too high, the ROHC decompressor may lose synchronization with the transmitting PDCP entity.

In another aspect of the present disclosure, a receiving PDCP entity may improve the efficiency of a ROHC decompression performed by a ROHC decompressor, such as during a PDCP re-establishment, by reducing the number of duplicate PDCP packets that may appear as losses to the ROHC decompressor before the ROHC context reset (e.g., at 512, 712). In one aspect, a receiving PDCP entity may be configured not to decompress PDCP packets that are out of order (e.g., PDCP packets that are not in consecutive SNs), and the receiving PDCP entity may discard one or more PDCP packets that are out of order. Then, the receiving PDCP entity may send a PDCP status report to the transmitting PDCP entity to indicate the one or more PDCP packets (e.g., PDCP PDUs) that are missing or out of order. For example, the receiving PDCP entity may indicate a negative acknowledgement (NACK) feedback for each of the one or more PDCP packets that are missing or out of order starting from the first missing PDCP packet in the PDCP status report. Based on the PDCP status report, the transmitting PDCP entity may retransmit PDCP packets with NACK feedback using a new ROHC context. In some examples, a transmitting PDCP entity may discard PDCP packets (e.g., PDUs) that have been acknowledged in a PDCP status report after the header compression. As such, if a transmitting PDCP entity is configured to retransmit PDCP packets with NACK feedbacks, the transmitting PDCP entity may be configured not to discard PDCP packets that have been acknowledged because the receiving PDCP entity may indicate NACK feedback for one or more earlier RLC acknowledged PDCP packets. Thus, all packets may reach the receiving PDCP entity as shown in connection with FIGS. 5 and 7.

Figure 8:
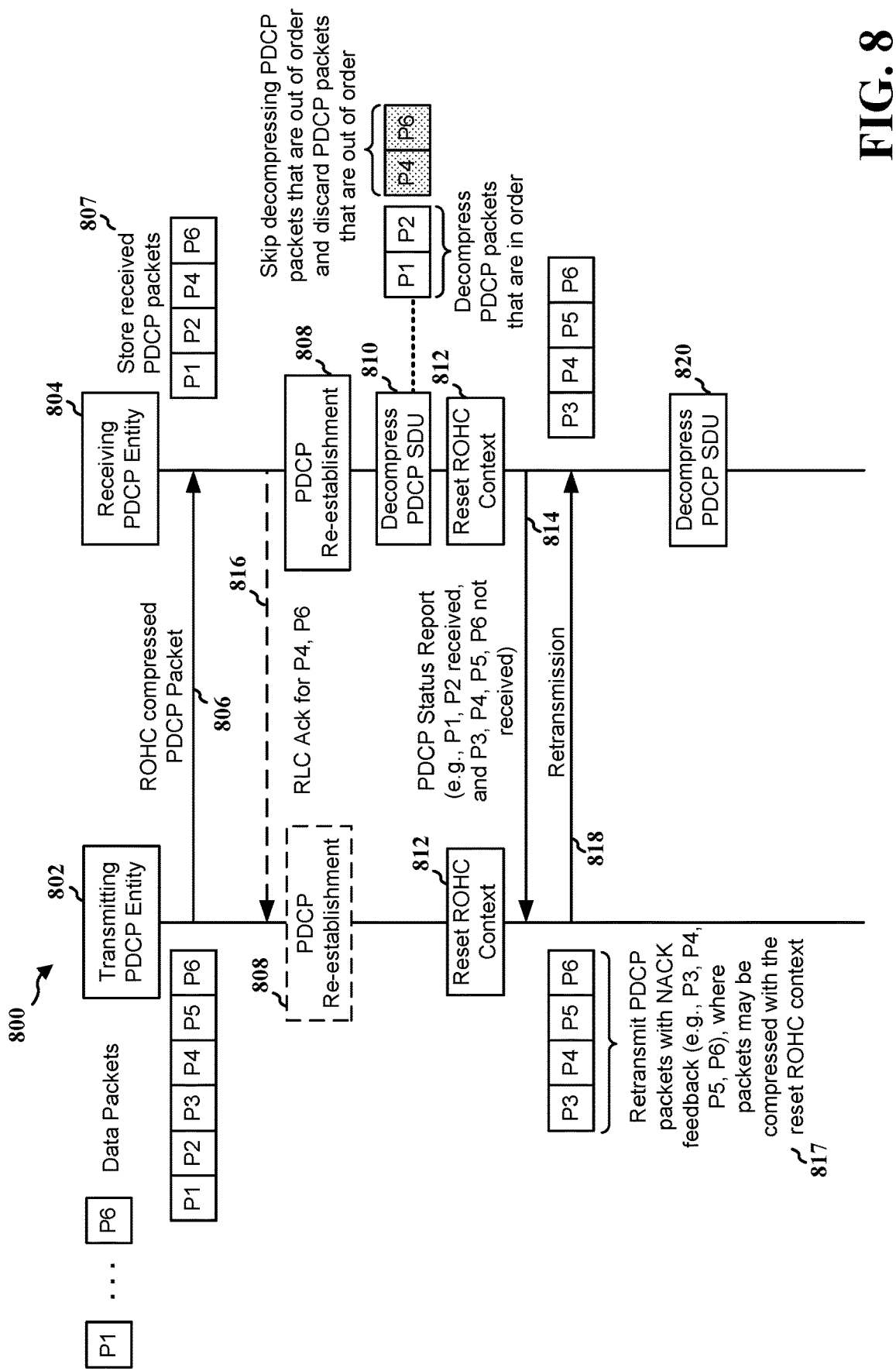
FIG. 8 is an example communication flow between a transmitting PDCP entity and a receiving PDCP entity according to aspects of the present disclosure.

FIG. 8 is a communication flow 800 illustrating an example of configuring a receiving PDCP entity not to decompress out of order PDCP packets and to transmit a PDCP status report with NACK feedback according to aspects of the present disclosure. In one example, at 806, a transmitting PDCP entity 802 may transmit ROHC compressed PDCP packets P1, P2, P3, P4, P5 and P6 (e.g., PDCP SDUs) to a receiving PDCP entity 804. The receiving PDCP entity 804 may receive PDCP packets P1, P2, P4 and P6, but may not have received the PDCP packets P3 and P5. As shown at 807, the receiving PDCP entity 804 may store the received PDCP packets P1, P2, P4 and P6 at the receiving PDCP entity 804. In some examples, the receiving PDCP entity 804 may receive one or more PDCP packets based on a first ROHC profile. For example, an uplink (UL) PDCP re-establishment of an ROHC bearer with a ROHC profile, such as profiles 1, 2, 3, 4, 5, 6 etc., may be enabled. Then, at 808, the receiving PDCP entity 804 and/or the transmitting PDCP entity 802 may initiate a PDCP re-establishment procedure.

At 810, after the PDCP re-establishment procedure is initiated, the receiving PDCP entity 704 may decompress stored PDCP packets that are not out of order (e.g., PDCP packets with consecutive sequence numbering), and may skip decompressing PDCP packets that are out of order. Then, the receiving PDCP entity 804 may discard one or more PDCP packets that are out of order. For example, as shown at 810, the receiving PDCP entity 804 may decompress PDCP packets P1 and P2 as they are in order, and the receiving PDCP entity 804 may skip decompressing PDCP packets P4 and P6 as they are out of order (e.g., P3 and P5 are missing) and may discard the PDCP packets P4 and P6. As such, none of the PDCP packets may appear as losses to the ROHC decompressor during the decompression.

At 812, after the receiving PDCP entity 804 decompresses PDCP packets that are in order, both the transmitting PDCP entity 802 and the receiving PDCP entity 804 may reset their ROHC context.

At 814, the receiving PDCP entity 804 may transmit a PDCP status report to the transmitting PDCP entity 802. In some examples, as shown at 816, prior to transmitting the PDCP status report, the receiving PDCP entity 804 may have transmitted RLC ACK for successfully received PDCP packets based on the first ROHC context (e.g., before ROHC reset at 812), which may include one or more PDCP packets that are received after the first missing packet (e.g., the PDCP packet P3). The PDCP status report may indicate a NACK for one or more PDCP packets that are missing (e.g., discarded, not received, etc.) starting from the first missing PDCP packet with a NACK feedback. For example, as PDCP packets P3 and P5 were not received by the receiving PDCP entity 804 and PDCP packets P4 and P6 have been discarded, the receiving PDCP entity 804 may indicate PDCP packets P3, P4, P5 and P6 as NACK in the PDCP status report.

At 818, in response to the PDCP status report, the transmitting PDCP entity 802 may retransmit the PDCP packets with NACK feedback in the PDCP status report. For example, as the PDCP status report indicates PDCP packets P3, P4, P5 and P6 as NACK, the transmitting PDCP entity 802 may retransmit PDCP packets P3, P4, P5 and P6 after header compression using a new ROHC context. In some examples, as the PDCP status report does not acknowledge the receipt of PDCP packets P4 and P6, the receiving PDCP entity 804 may not consider PDCP packets P4 and P6 received in the retransmission at 818 as duplicates. In some examples, the retransmissions may be compressed by the transmitting PDCP entity 802 with the reset ROHC context (e.g., the second ROH context at 812), such as shown at 817. In some examples, the retransmissions may be compressed by the transmitting PDCP entity 802 with ROHC profile 0 instead of ROHC profile 6.

In one, during an uplink PDCP re-establishment of ROHC bearer with profile 6 enabled, the transmitting PDCP entity 804 may reset ROHC handle and compress retransmitted PDCP packets with SN X to SN (X+Y) with profile 0 (e.g., ROHC profile 0x0 or 0x0000) instead of profile 6 while compressing new PDCP packets with profile 6 at 817. As such, the first num_ir packets of both PDCP retransmissions and new transmissions are IR packets. Then, the receiving PDCP entity 804 may transmit a PDCP status report to the transmitting PDCP entity 802 with an FMC equals to X+Z, where Z may be smaller than Y (e.g., Z<Y) as the receiving PDCP entity 804 may not acknowledge PDU that is not transmitted by the transmitting PDCP entity 802. In response, the transmitting PDCP entity 802 may discard the acknowledged PDUs in the PDCP status report and reset ROHC compress handle, and the transmitting PDCP entity 802 may compress PDCP retransmissions starting from (X+Z) to the last PDCP retransmission with profile 0. In some examples, the first packets may be IR packets and may be delivered to the ROHC decompressor of the receiving PDCP entity 804 by PDCP as they are not duplicated packets. As such, the number of packets to be compressed by the transmitting PDCP entity 802 may be limited in a PDCP packet retransmission, which may be much less than processing PDCP retransmissions with new transmissions. In addition, compression of profile 0 may be much faster than compression of profile 6. In other examples, if the receiving PDCP entity 804 does not transmit a PDCP status report to the transmitting PDCP entity 802 and a PDCP re-establishment is performed between the receiving PDCP entity 804 and the transmitting PDCP entity 802, the receiving PDCP entity 804 may be configured to compress packets with ROHC profile 0 so that the receiving PDCP entity 804 may not have a problem even if duplicate packets are discarded by the receiving PDCP entity 804. For example, when the transmitting PDCP entity 802 retransmits PDCP packets with SN X to SN X+Y to the receiving PDCP entity 804, the first missing packet at the receiving PDCP entity 804 may be X+Z (e.g., Z<Y) even though no PDCP status report is transmitted by the receiving PDCP entity 804. Then, the receiving PDCP entity 804 may start decompressing PDCP packets from SN X+Z and onwards. As such, if ROHC profile 0 is used, there may be no decompression loss at the receiving PDCP entity 804.

At 820, after the receiving PDCP entity 804 receives the retransmission for the PDCP packets with NACK feedback (e.g., PDCP packets P3, P4, P5 and P6), the receiving PDCP entity 804 may perform decompression for the retransmitted PDCP packets. As retransmitted PDCP packets are not discarded and/or out of order, no PDCP packets may appear as losses to the ROHC decompressor. As such, aspects presented herein may improve the efficiency of the ROHC operation.

Figure 9:
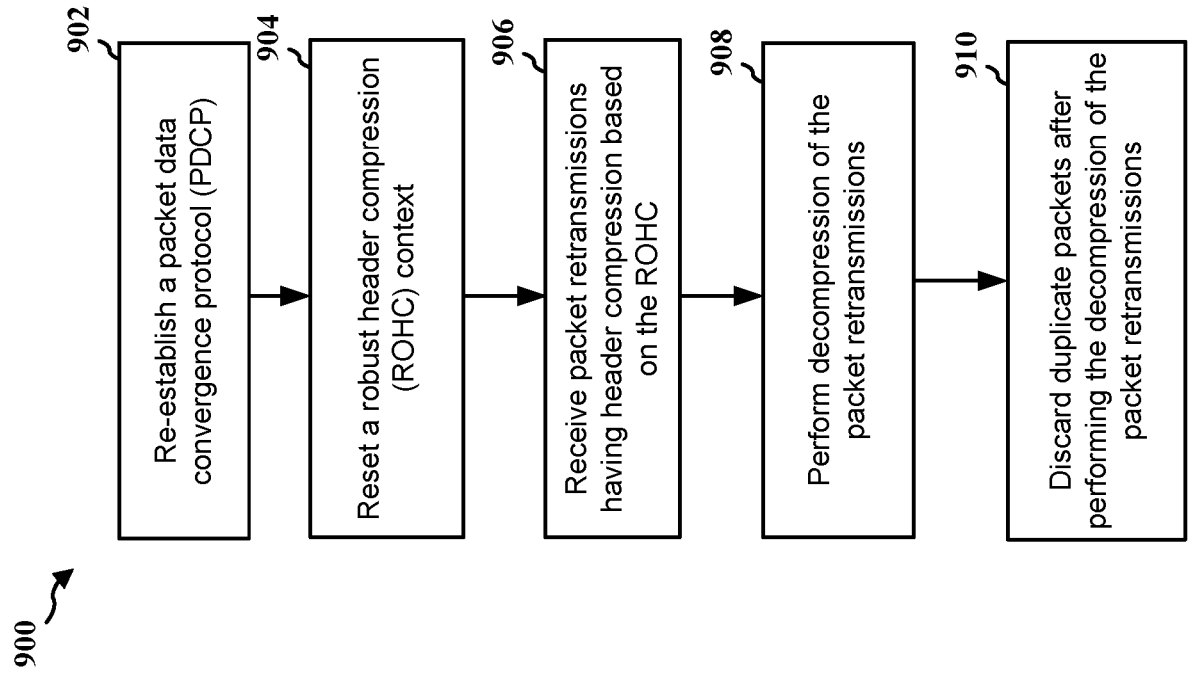
FIG. 9 is a flowchart of a method of wireless communication.

FIG. 9 is a flowchart of a method 900 of wireless communication. The method may be performed by a receiving device or a component of a receiving device (e.g., the receiving PDCP entity 504, 604, 704). In some examples, the receiving device may be a UE or a component of a UE, e.g., UE 104, 350, the apparatus 1002, or a processing system, which may include the memory 360 and which may be the entire UE 350 or a component of the UE 350, such as the TX processor 368, the RX processor 356, and/or the controller/processor 359. In other examples, the receiving device may be a base station or a component of a base station 102, 180, 310, or a processing system, which may include the memory 376 and which may be the entire base station 310 or a component of the base station 310, such as the TX processor 316, RX processor 370, and/or the controller/processor 375. Optional aspects are illustrated with a dashed line. The method may enable a receiving device to change the processing order of ROHC header decompression and duplicate PDCP packets discarding, such as during a PDCP re-establishment.

At 902, the receiving device may re-establish a PDCP entity. The PDCP entity may be re-established during a handover or RLF re-establishment, such as described in connection with FIGS. 6 and 7. For example, at 708, the receiving PDCP entity 704 may initiate a PDCP re-establishment. The re-establishment of the PDCP entity may be performed, e.g., by the PDCP re-establishment component 1040 of the apparatus 1002 in FIG. 10.

At 904, after the receiving device re-establishes the PDCP entity, the receiving device may reset a ROHC context, such as described in connection with FIGS. 6 and 7. For example, at 712, the receiving PDCP entity 704 may reset the ROHC context. The reset of ROHC context may be performed, e.g., by the ROHC reset component 1042 of the apparatus 1002 in FIG. 10.

At 906, after the receiving device resets the ROHC context, the receiving device may receive packet retransmissions having header compression based on the ROHC, such as described in connection with FIGS. 6 and 7. For example, at 714, the receiving PDCP entity 704 may receive packet retransmissions having header compression based on the reset ROHC. The reception of packet retransmissions may be performed, e.g., by the retransmission reception component 1044 and/or the reception component 1030 of the apparatus 1002 in FIG. 10. In some examples, the retransmission of the packets may base on a PDCP status report sent by the receiving device.

At 908, after receiving packet retransmissions, the receiving device may perform decompression of the packet retransmissions, such as described in connection with FIGS. 6 and 7. For example, at 716, the receiving PDCP entity 704 may decompress the received PDCP packet retransmissions. The decompression of packet retransmissions may be performed, e.g., by the decompression component 1046 and/or the reception component 1030 of the apparatus 1002 in FIG. 10.

At 910, the receiving device may discard duplicate packets after performing the decompression of the packet retransmissions, such as described in connection with FIGS. 6 and 7. For example, at 718, the receiving PDCP entity 704 may discard duplicate PDCP packets. The discarding of duplicate packets may be performed, e.g., by the duplicate packet process component 1048 of the apparatus 1002 in FIG. 10.

In one example, the receiving device may discard the duplicate packets after performing the decompression of the packet retransmissions up to decompressing a final lost packet before the PDCP entity was re-established, and after decompressing the final lost packet the receiving device may discard the duplicate packets before performing the decompression, such as described in connection with FIG. 7.

In another example, the receiving device may discard a duplicate packet after performing the decompression of the packet retransmissions if the duplicate packet duplicates a packet received before the PDCP entity was re-established, such as described in connection with FIG. 7.

In another example, the receiving device may discard the duplicate packet before performing the decompression if the duplicate packet duplicates a packet received after the PDCP entity is re-established, such as described in connection with FIG. 7.

In another example, the receiving device may discard the duplicate packets after performing the decompression of the packet retransmissions until a timer expires, and after the timer expires the receiving device may discard the duplicate packets before performing the decompression, such as described in connection with FIG. 7. In another example, the receiving device may discard the duplicate packets after performing the decompression of the packet retransmissions until feedback is received from an ROHC decompressor, and wherein after the feedback from the ROHC decompressor, the receiving device may discard the duplicate packets before performing the decompression, such as described in connection with FIG. 7. The feedback may indicate that the ROHC decompressor has a valid ROHC context.

Figure 10:
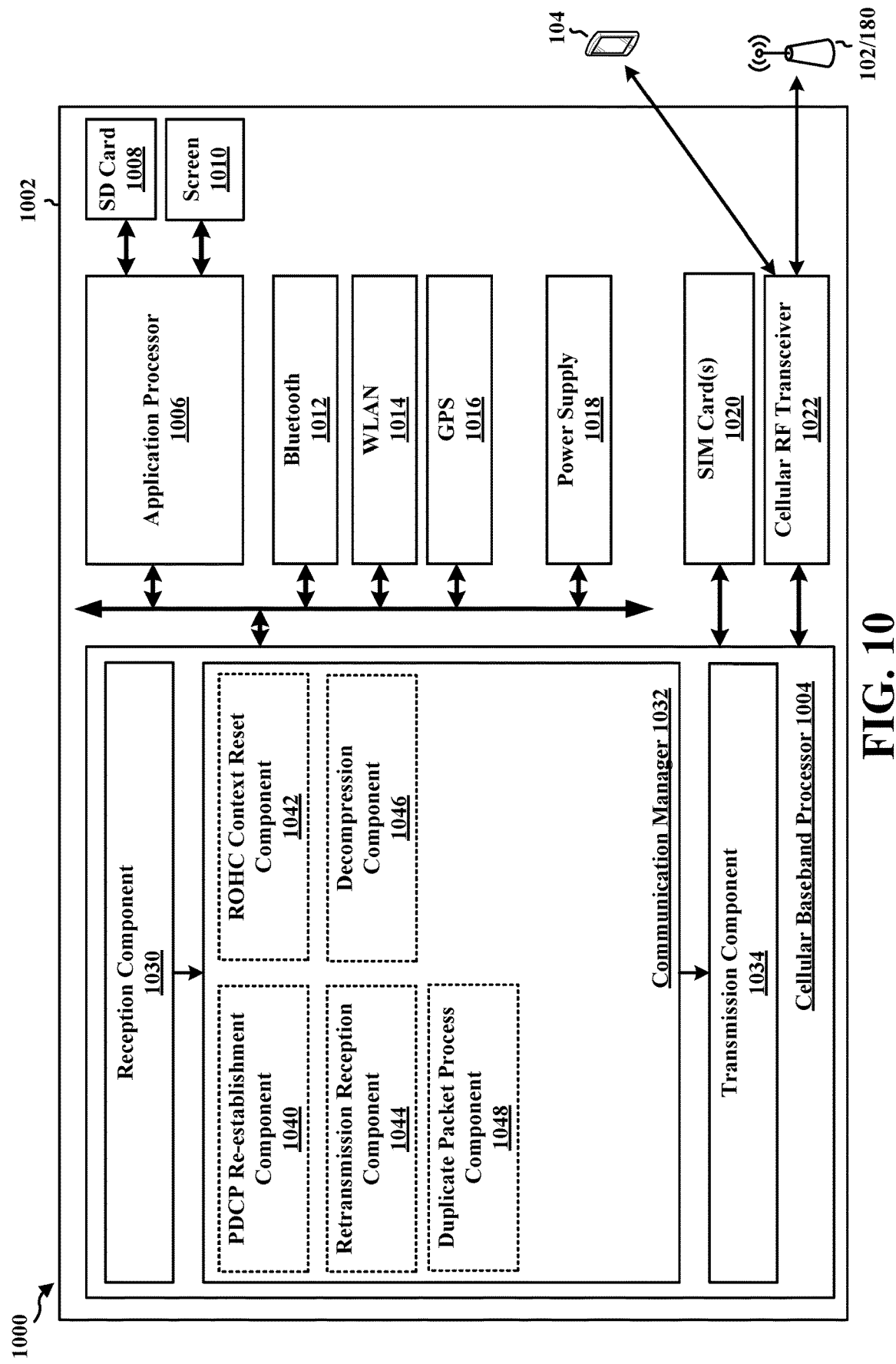
FIG. 10 is a diagram illustrating an example of a hardware implementation for an example apparatus in accordance with aspects presented herein.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the additional modules of the apparatus 1002.

The communication manager 1032 includes a PDCP re-establishment component 1040 that is configured to re-establish a PDCP entity, e.g., as described in connection with 902 of FIG. 9. The communication manager 1032 further includes a ROHC context reset component 1042 that is configured to reset a ROHC context, e.g., as described in connection with 904 of FIG. 9. The communication manager 1032 further includes a retransmission reception component 1044 that is configured to receive packet retransmissions having header compression based on the ROHC, e.g., as described in connection with 906 of FIG. 9. The communication manager 1032 further includes a decompression component 1046 that is configured to perform decompression of the packet retransmissions, e.g., as described in connection with 908 of FIG. 9. The communication manager 1032 further includes a duplicate packet process component 1048 that is configured to discard duplicate packets after performing the decompression of the packet retransmissions, e.g., as described in connection with 910 of FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for re-establishing a PDCP entity (e.g., the PDCP re-establishment component 1040). The apparatus 1002 includes means for resetting a ROHC context (e.g., the ROHC context reset component 1042). The apparatus 1002 includes means for receiving packet retransmissions having header compression based on the ROHC (e.g., the retransmission reception component 1044 and/or the reception component 1030). The apparatus 1002 includes means for performing decompression of the packet retransmissions (e.g., the decompression component 1046). The apparatus 1002 includes means for discarding duplicate packets after performing the decompression of the packet retransmissions (e.g., the duplicate packet process component 1048).

The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
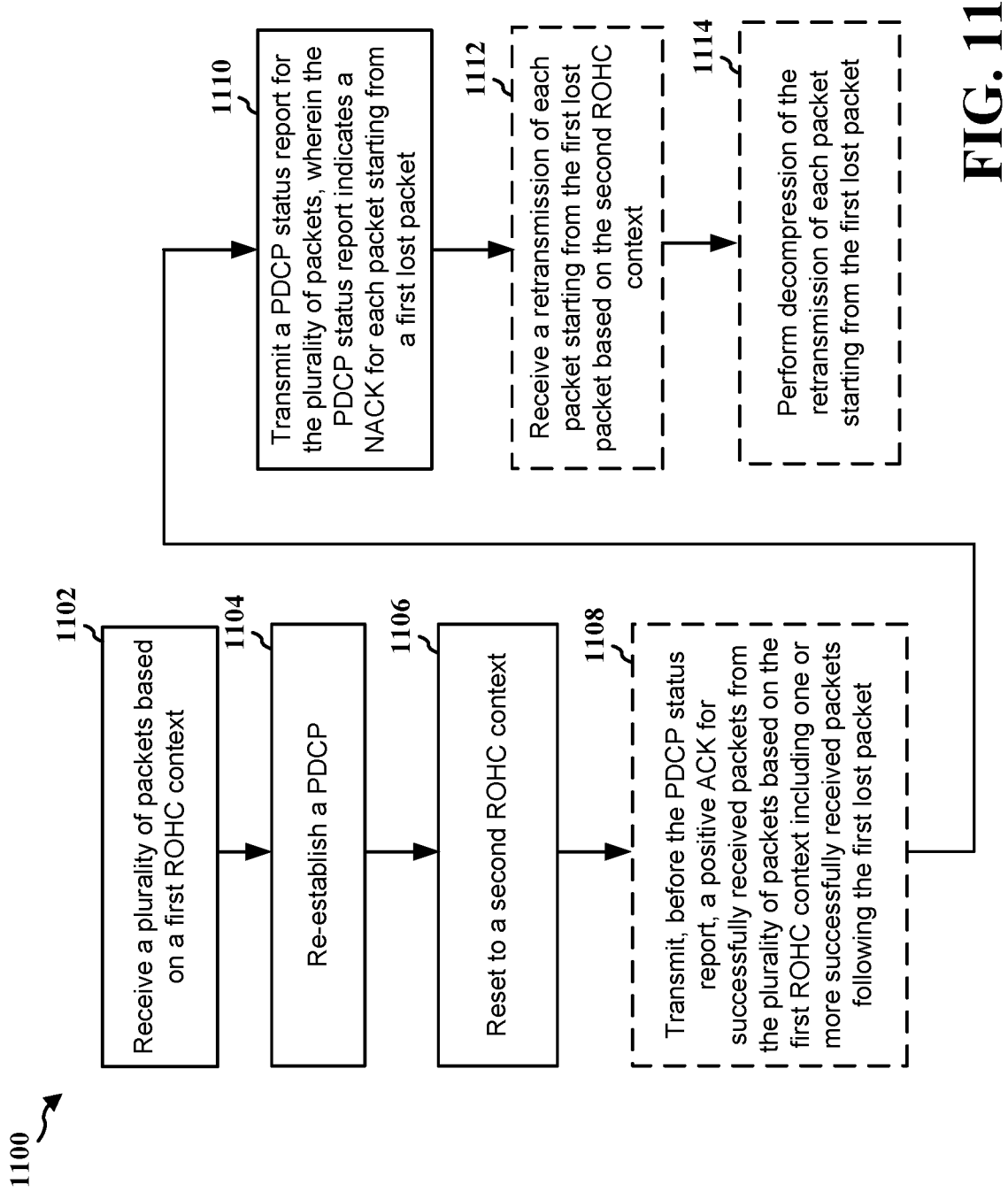
FIG. 11 is a flowchart of a method of wireless communication.

FIG. 11 is a flowchart of a method 1100 of wireless communication. The method may be performed by a receiving device or a component of a receiving device (e.g., the receiving PDCP entity 804). In some examples, the receiving device may be a UE or a component of a UE, e.g., UE 104, 350, the apparatus 1202, or a processing system, which may include the memory 360 and which may be the entire UE 350 or a component of the UE 350, such as the TX processor 368, the RX processor 356, and/or the controller/processor 359. In some examples, the receiving device may be a base station or a component of a base station 102, 180, 310, or a processing system, which may include the memory 376 and which may be the entire base station 310 or a component of the base station 310, such as the TX processor 316, RX processor 370, and/or the controller/processor 375. Optional aspects are illustrated with a dashed line. The method may enable a receiving device not to decompress any PDCP packets that are out of order, and to send a PDCP status report with NACK feedback for PDCP packets that are missing and/or out of order.

At 1102, the receiving device may receive a plurality of packets based on a first ROHC context, such as described in connection with FIG. 8. For example, at 806, the receiving PDCP entity 804 may receive a plurality of PDCP packets from the transmitting PDCP entity 802. The reception of the plurality of packets may be performed, e.g., by the packet reception component 1240 of the apparatus 1202 in FIG. 12.

At 1104, after receiving the plurality of packets based on the first ROHC context, the receiving device may re-establish a PDCP entity, such as described in connection with FIG. 8. For example, at 808, the receiving PDCP entity may perform a PDCP re-establishment. The re-establishment of PDCP entity may be performed, e.g., by the PDCP re-establishment component 1242 of the apparatus 1202 in FIG. 12.

At 1106, after re-establishing the PDCP entity, the receiving device may reset to a second ROHC context, such as described in connection with FIG. 8. For example, at 812, the receiving PDCP entity 804 may reset the ROHC context to a second ROHC context. The reset of ROHC context may be performed, e.g., by the ROHC context reset component 1244 of the apparatus 1202 in FIG. 12.

At 1110, the receiving device transmits a PDCP status report for the plurality of packets, where the PDCP status report indicates a NACK for each packet starting from a first lost packet, such as described in connection with FIG. 8. For example, at 814, the receiving PDCP entity 804 may transmit a PDCP status report for the plurality of packets. The transmission of the PDCP status report may be performed, e.g., by the PDCP status report component 1246 and/or transmission component 1234 of the apparatus 1202 in FIG. 12.

At 1112, the receiving device receives a retransmission of each packet starting from the first lost packet based on the second ROHC context, such as described in connection with FIG. 8. For example, at 818, the receiving PDCP entity 804 may receive retransmissions of each packet starting from the first lost packet based on the second ROHC context. The reception of retransmission of each packet may be performed, e.g., by the reception component 1230 of the apparatus 1202 in FIG. 12.

At 1114, after receiving the retransmission, the receiving device may perform decompression of the retransmission of each packet starting from the first lost packet, such as described in connection with FIG. 8. For example, at 820, the receiving PDCP entity 804 may decompress the received retransmissions. The decompression of retransmission of each packet may be performed, e.g., by the decompression component 1248 of the apparatus 1202 in FIG. 12.

In one example, the receiving device may not decompress packets out of order. For example, the receiving device may avoid decompressing packets out of order or may be limited from decompressing packets out of order. In another example, the receiving device may not decompress packets out of order before resetting to the second ROHC context.

In another example, as illustrated at 1108, the receiving device may transmit, before the PDCP status report, an RLC ACK for successfully received packets from the plurality of packets based on the first ROHC context including one or more successfully received packets following the first lost packet.

Figure 12:
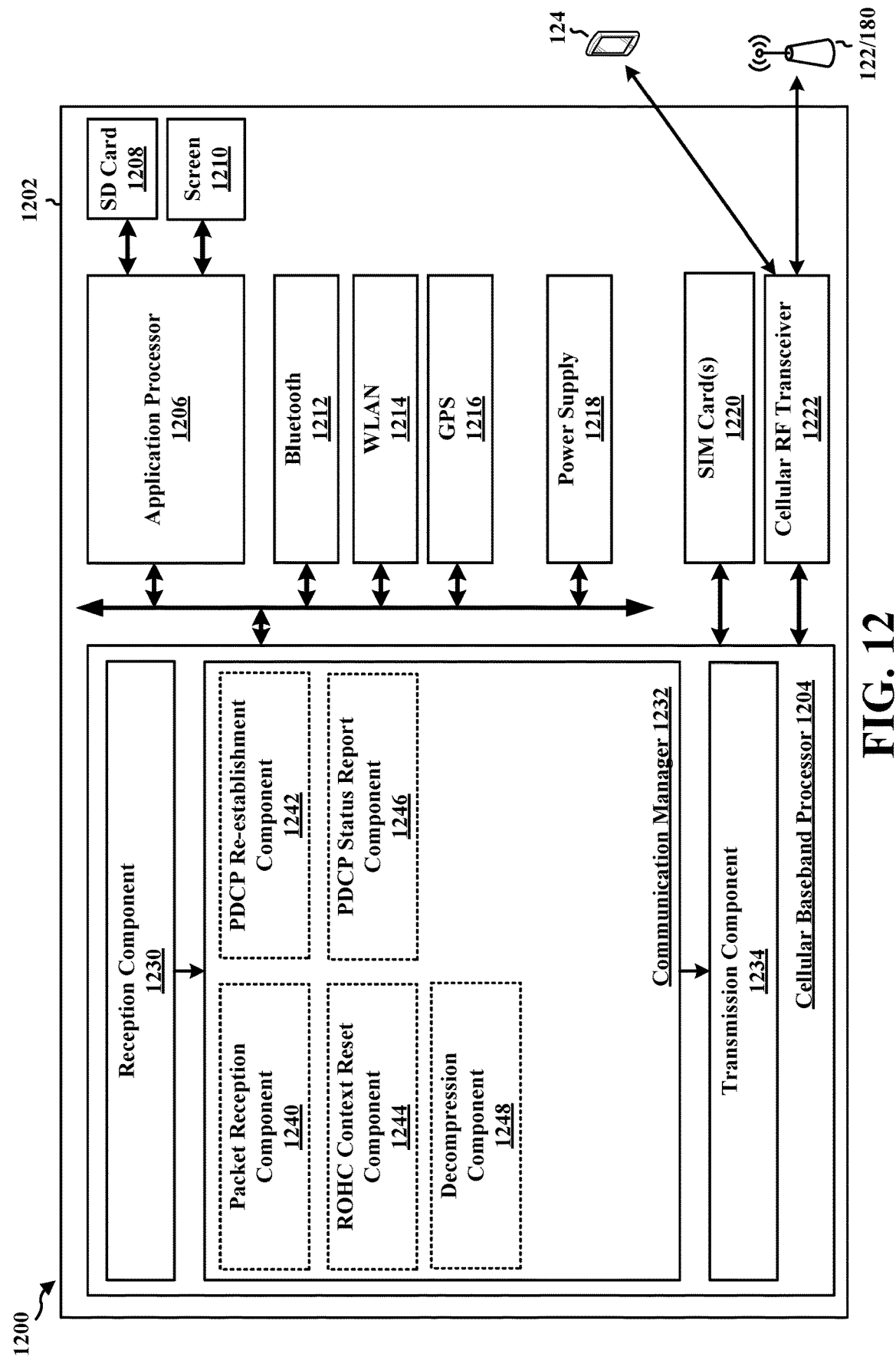
FIG. 12 is a diagram illustrating an example of a hardware implementation for an example apparatus in accordance with aspects presented herein.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The communication manager 1232 includes a packet reception component 1240 that is configured to receive a plurality of packets based on a first ROHC context, e.g., as described in connection with 1102 of FIG. 11. The communication manager 1232 further includes a PDCP re-establishment component 1242 that is configured to re-establish a PDCP entity, e.g., as described in connection with 1104 of FIG. 11. The communication manager 1232 further includes a ROHC context reset component 1244 that is configured to reset to a second ROHC context, e.g., as described in connection with 1106 of FIG. 11. The communication manager 1232 further includes a PDCP status report component 1246 that is configured to transmit a PDCP status report for the plurality of packets, wherein the PDCP status report indicates a NACK for each packet starting from a first lost packet, e.g., as described in connection with 1110 of FIG. 11.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for receiving a plurality of packets based on a first ROHC context (e.g., the packet reception component 1240 and/or the reception component 1230). The apparatus 1202 includes means for re-establishing a PDCP entity (e.g., the PDCP re-establishment component 1242). The apparatus 1202 includes means for resetting to a second ROHC context (e.g., the ROHC context reset component 1244). The apparatus 1202 includes means for transmitting a PDCP status report for the plurality of packets, wherein the PDCP status report indicates a NACK for each packet starting from a first lost packet (e.g., the PDCP status report component 1246 and/or the transmission component 1234).

The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
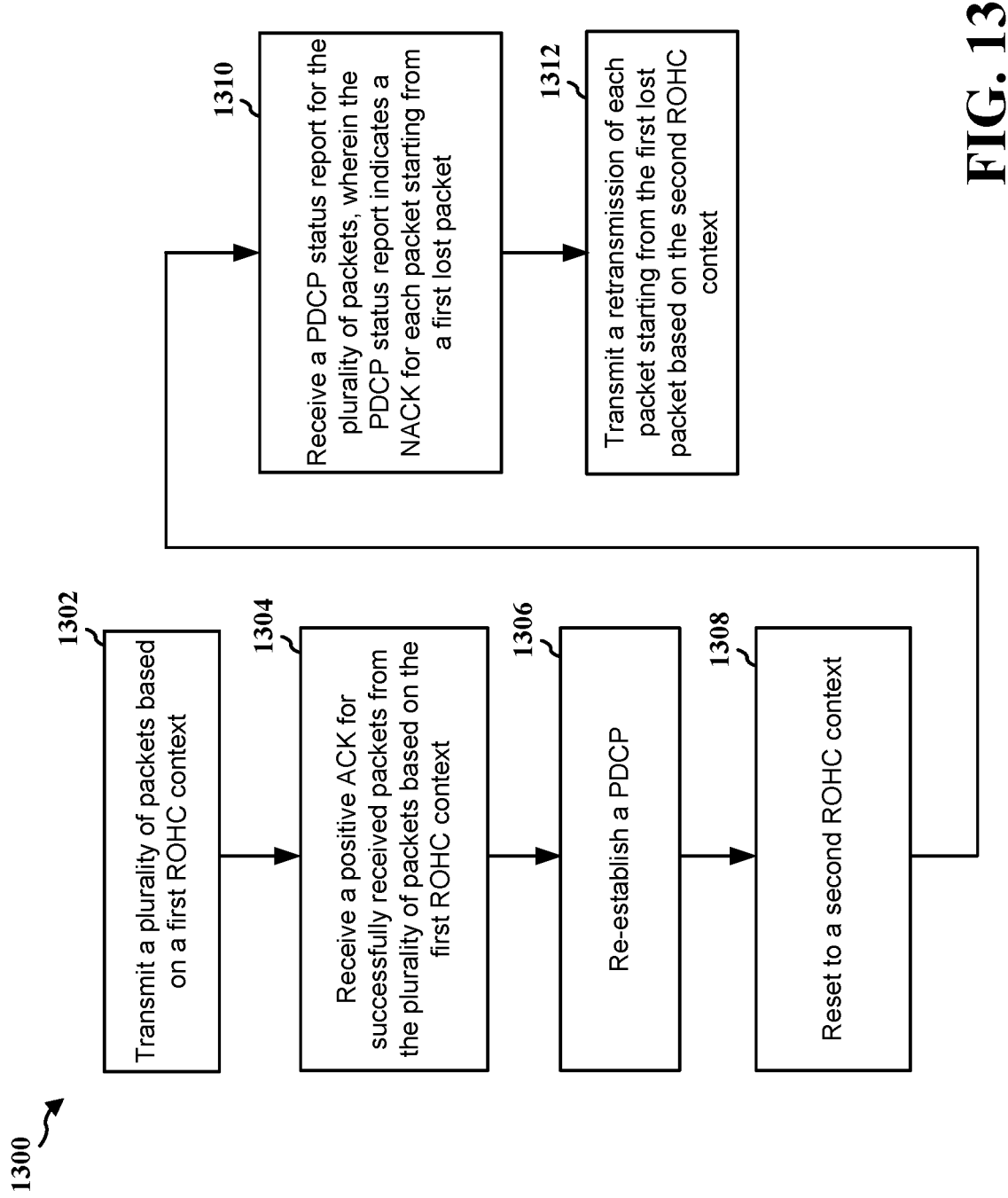
FIG. 13 is a flowchart of a method of wireless communication.

FIG. 13 is a flowchart of a method 1300 of wireless communication. The method may be performed by a transmitting device or a component of a transmitting device (e.g., the transmitting PDCP entity 802). In some examples, the transmitting device may be a UE or a component of a UE, e.g., UE 104, 350, or a processing system, which may include the memory 360 and which may be the entire UE 350 or a component of the UE 350, such as the TX processor 368, the RX processor 356, and/or the controller/processor 359). In some examples, the transmitting device may be a base station or a component of a base station 102, 180, 310, or a processing system, which may include the memory 376 and which may be the entire base station 310 or a component of the base station 310, such as the TX processor 316, RX processor 370, and/or the controller/processor 375. Optional aspects are illustrated with a dashed line.

At 1302, the transmitting device may transmit a plurality of packets based on a first ROHC context, such as shown in connection with FIG. 8 (e.g., at 806).

At 1304, after transmitting a plurality of packets, the transmitting device may receive an RLC ACK for successfully received packets from the plurality of packets based on the first ROHC context.

At 1306, the transmitting device may re-establish a PDCP entity, such as described in connection with FIG. 8 (e.g., at 808).

At 1308, the transmitting device may reset to a second ROHC context, such as described in connection with FIG. 8 (e.g., at 812).

At 1310, the transmitting device may receive a PDCP status report for the plurality of packets, where the PDCP status report indicates a NACK for each packet starting from a first lost packet, such as shown in connection with FIG. 8 (e.g., 813). The PDCP status report may indicate the NACK for one or more packets for which the transmitting device previously received the ACK.

At 1312, the transmitting device may transmit a retransmission of each packet starting from the first lost packet based on the second ROHC context, such as shown in connection with FIG. 8 (e.g., 814). In one example, the transmitting device may transmit a retransmission for the one or more packets for which the transmitting device previously received the ACK.

Each block in the aforementioned flowchart of FIG. 13 and aspects performed by the transmitting PDCP entity 802 in FIG. 8 may be performed by at least one component of an apparatus, each component being one or more hardware components specifically configured to carry out the stated processes/algorithm, implemented by a processor configured to perform the stated processes/algorithm, stored within a computer-readable medium for implementation by a processor, or some combination thereof. The components may be software components running in a processor, resident/stored in the computer readable medium/memory, one or more hardware components coupled to the processor, or some combination thereof. The processing system may be a component of the UE 350 and may include the memory 360 and/or at least one of the TX processor 368, the RX processor 356, and the controller/processor 359. Alternatively, the processing system may be the entire UE (e.g., see UE 350 of FIG. 3). The system may be a component of the base station 310 and may include the memory 376 and/or at least one of the TX processor 316, the RX processor 370, and the controller/processor 375. Alternatively, the processing system may be the entire base station (e.g., see 310 of FIG. 3).

In one configuration, an apparatus for wireless communication at a transmitting device may include means for transmitting a plurality of packets based on a first ROHC context; means for receiving a RLC ACK for successfully received packets from the plurality of packets based on the first ROHC context; means for re-establishing a PDCP; means for resetting to a second ROHC context; and means for receiving a PDCP status report for the plurality of packets, wherein the PDCP status report indicates a NACK for each packet starting from a first lost packet, e.g., as described in connection with FIG. 8. The apparatus may further include means for transmitting a retransmission of each packet starting from the first lost packet based on the second ROHC context. The aforementioned means may be one or more of the aforementioned components of the apparatus and/or the processing system of the apparatus configured to perform the functions recited by the aforementioned means. The processing system may include the TX Processor 368, the RX Processor 356, and the controller/processor 359. The processing system may be a component of the base station 310 and may include memory 376 and/or at least one of the TX Processor 316, the RX Processor 370, and the controller/processor 375. Alternatively, the processing system may be the entire base station (e.g., see base station 310 of FIG. 3). As such, in one configuration, the aforementioned means may be the TX Processor 316 or 368, the RX Processor 356 or 370, and the controller/processor 359 or 375 configured to perform the functions recited by the aforementioned means.

Figure 14:
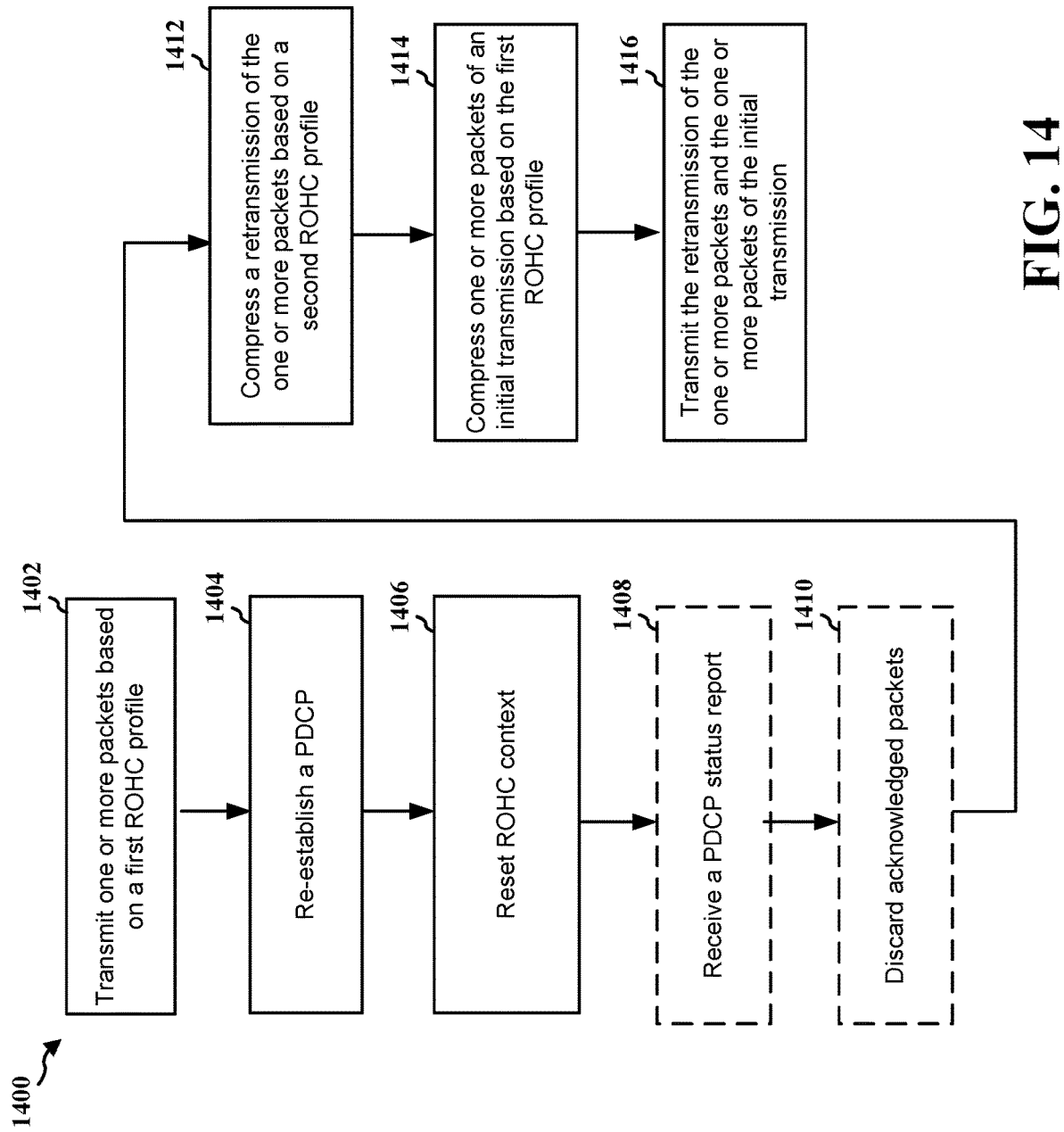
FIG. 14 is a flowchart of a method of wireless communication.

FIG. 14 is a flowchart of a method 1400 of wireless communication. The method may be performed by a transmitting device or a component of a transmitting device (e.g., the transmitting PDCP entity 802). In some examples, the transmitting device may be a UE or a component of a UE, e.g., UE 104, 350, or a processing system, which may include the memory 360 and which may be the entire UE 350 or a component of the UE 350, such as the TX processor 368, the RX processor 356, and/or the controller/processor 359). In some examples, the transmitting device may be a base station or a component of a base station 102, 180, 310, or a processing system, which may include the memory 376 and which may be the entire base station 310 or a component of the base station 310, such as the TX processor 316, RX processor 370, and/or the controller/processor 375. Optional aspects are illustrated with a dashed line.

At 1402, a transmitting PDCP entity may transmit one or more packets based on a first ROHC profile, such as described in connection with FIG. 8. For example, at 806, the transmitting PDCP entity 802 may transmit a plurality of PDCP packets to the receiving PDCP entity 804.

At 1404, the transmitting PDCP entity may re-establish a PDCP, such as described in connection with FIG. 8. For example, at 808, the transmitting PDCP entity 802 may perform a PDCP re-establishment.

At 1406, a transmitting PDCP entity may reset ROHC context, such as described in connection with FIG. 8. For example, at 812, the transmitting PDCP entity 802 may reset the ROHC context to a second ROHC context.

At 1408, the transmitting PDCP entity may receive a PDCP status report, such as described in connection with FIG. 8. For example, at 814, the transmitting PDCP entity 802 may transmit a PDCP status report for the plurality of packets receiving PDCP entity. Then, at 1410, the transmitting PDCP entity may discard acknowledged packets, such as described in connection with FIG. 8.

At 1412, a transmitting PDCP entity may compress a retransmission of the one or more packets based on a second ROHC profile, such as described in connection with FIG. 8. For example, at 817, the retransmissions may be compressed by the transmitting PDCP entity 802 with the reset ROHC context. In some examples, the first ROHC profile may include a ROHC profile that is not profile 0 (e.g., ROHC profiles 1-6, etc.), and the second ROHC profile may include a profile 0.

At 1414, a transmitting PDCP entity may compress one or more packets of an initial transmission based on the first ROHC profile, such as described in connection with FIG. 8. For example, at 817, the transmitting PDCP entity 802 may compress one or more packets of an initial transmission based on the first ROHC profile.

At 1416, a transmitting PDCP entity may transmit the retransmission of the one or more packets and the one or more packets of the initial transmission, such as described in connection with FIG. 8. For example, at 818, the transmitting PDCP entity 802 may transmit the retransmission of the one or more packets and the one or more packets of the initial transmission to the receiving PDCP entity 804.

Figure 15:
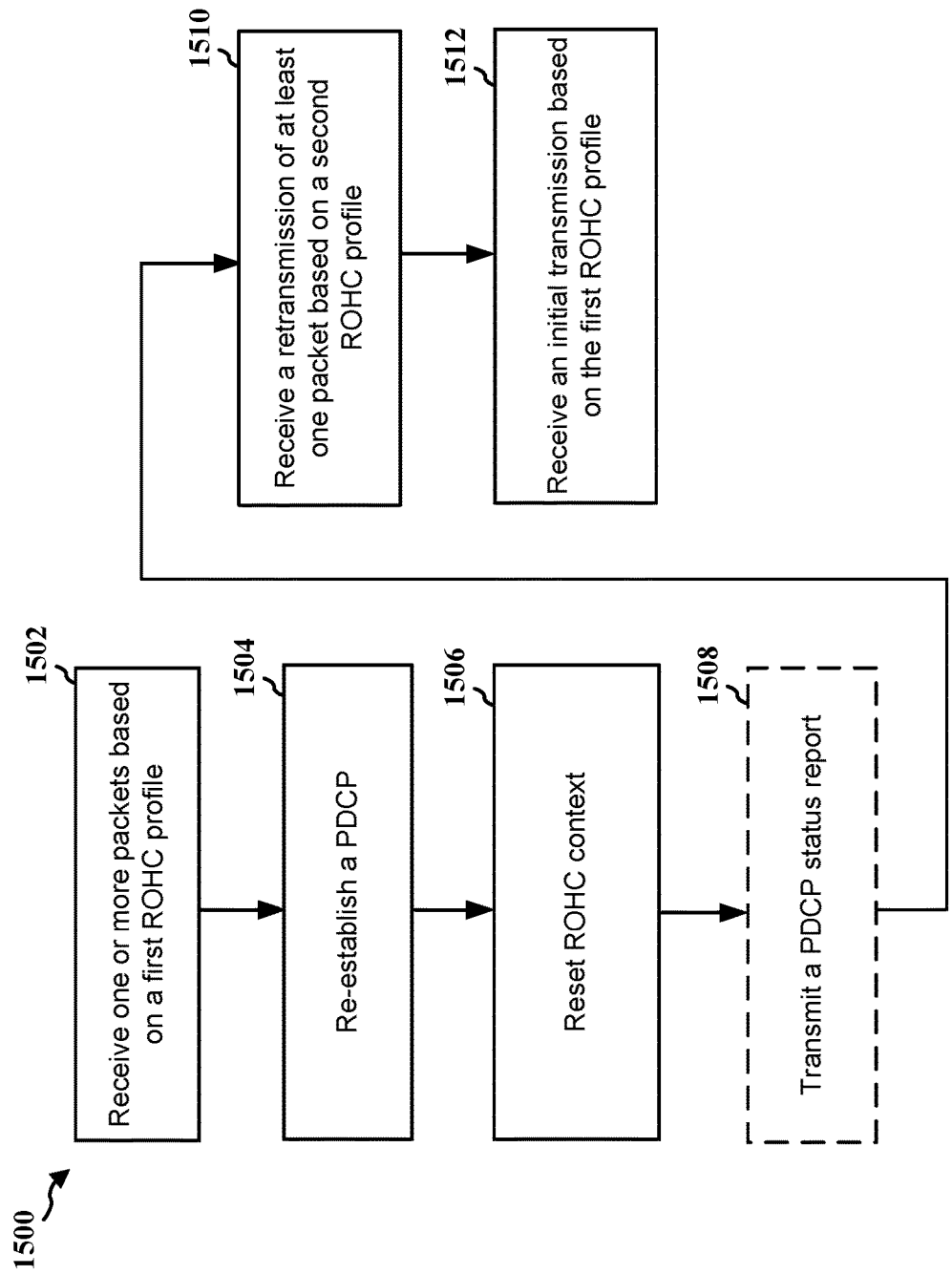
FIG. 15 is a flowchart of a method of wireless communication.

FIG. 15 is a flowchart of a method 1500 of wireless communication. The method may be performed by a receiving device or a component of a receiving device (e.g., a receiving PDCP entity). In some examples, the receiving device may be a UE or a component of a UE, e.g., UE 104, 350, or a processing system, which may include the memory 360 and which may be the entire UE 350 or a component of the UE 350, such as the TX processor 368, the RX processor 356, and/or the controller/processor 359). In some examples, the receiving device may be a base station or a component of a base station 102, 180, 310, or a processing system, which may include the memory 376 and which may be the entire base station 310 or a component of the base station 310, such as the TX processor 316, RX processor 370, and/or the controller/processor 375. Optional aspects are illustrated with a dashed line.

At 1502, the receiving device may receive one or more packets based on a first ROHC profile, such as described in connection with FIGS. 7 and 8. For example, at 706, the receiving PDCP entity 704 may receive one or more packets based on a first ROHC profile (e.g., context). In some examples, an UL PDCP re-establishment of an ROHC bearer with the first profile may be enabled, where the first ROHC profile may be one of ROHC profiles 1, 2, 3, 4, 5 or 6.

At 1504, the receiving device re-establishes a PDCP entity, and at 1506, the receiving device resets an ROHC context, such as described in connection with FIGS. 7 and 8. For example, at 708, the receiving PDCP entity 704 may initiate a PDCP re-establishment, and at 712, the receiving PDCP entity 704 may reset the ROHC context.

As illustrated at 1508, the receiving device may transmit a PDCP status report acknowledging receipt of the packets received at 1502, such as described in connection with FIG. 8. For example, at 814, the receiving PDCP entity 804 may transmit a PDCP status report for the plurality of packets. For example, the PDCP status report may indicate an FMC equal to x+z, e.g., for packets having SN x+z. In response to the status report, the transmitting device may discard the acknowledged PDUs and reset the ROHC handling, e.g., starting from SN x+z to a last PDCP retransmission.

At 1510, the receiving device receives a retransmission of at least one packet based on a second ROHC profile, such as described in connection with FIG. 8. For example, at 818, the receiving PDCP entity 804 may receive retransmissions of each packet starting from the first lost packet based on the second ROHC context. In some examples, the retransmissions may be compressed with profile 0 instead of profile 6.

At 1512, the receiving device receives one or more packets of an initial transmission based on the first ROHC profile. For example, the initial transmissions, after the re-establishment and of the PDCP entity and the reset of the ROHC context, may be based on profile 6, whereas the retransmissions are based on profile 0. As the first packets of both the retransmission and the initial transmission are IR packets, the packets will be delivered to the ROHC decompressor by the PDCP, e.g., because they are not duplicate packets. The method reduces the number of packets to compress for the retransmission and reduces the retransmission compression by separately compressing the initial transmissions following the ROHC reset.

The following examples set forth additional aspects and are illustrative only and aspects thereof may be combined with aspects of other examples or teaching described herein, without limitation.

Aspect 1 is a method of wireless communication at a receiving device, comprising: re-establishing a PDCP entity; resetting a ROHC context; receiving packet retransmissions having header compression based on the ROHC; performing decompression of the packet retransmissions; and discarding duplicate packets after performing the decompression of the packet retransmissions.

In aspect 2, the method of aspect 1 further includes that the receiving device discards the duplicate packets after performing the decompression of the packet retransmissions up to decompressing a final lost packet before the PDCP entity was re-established, and wherein after decompressing the final lost packet the receiving device discards the duplicate packets before performing the decompression.

In aspect 3, the method of aspect 1 or aspect 2 further includes that the receiving device discards a duplicate packet after performing the decompression of the packet retransmissions if the duplicate packet duplicates a packet received before the PDCP entity was re-established.

In aspect 4, the method of any of aspects 1-3 further includes that the receiving device discards the duplicate packet before performing the decompression if the duplicate packet duplicates the packet received after the PDCP entity is re-established.

In aspect 5, the method of any of aspects 1-4 further includes that the receiving device discards the duplicate packets after performing the decompression of the packet retransmissions until a timer expires, and wherein after the timer expires the receiving device discards the duplicate packets before performing the decompression.

In aspect 6, the method of any of aspects 1-5 further includes that the receiving device discards the duplicate packets after performing the decompression of the packet retransmissions until feedback is received from an ROHC decompressor, and wherein after the feedback from the ROHC decompressor, the receiving device discards the duplicate packets before performing the decompression.

In aspect 7, the method of any of aspects 1-6 further includes that the feedback indicates that the ROHC decompressor has a valid ROHC context.

Aspect 8 is an apparatus for wireless communication at a receiving device, comprising: means for re-establishing a PDCP entity; means for resetting a ROHC context; means for receiving packet retransmissions having header compression based on the ROHC; means for performing decompression of the packet retransmissions; and means for discarding duplicate packets after performing the decompression of the packet retransmissions.

In aspect 9, the apparatus of aspect 8 further comprises means to perform the method of any of claims 2-7.

Aspect 10 is an apparatus for wireless communication at a receiving device, comprising: a memory; and at least one processor coupled to the memory, the memory and the at least one processor configured to: re-establish a PDCP entity; reset a ROHC context; receive packet retransmissions having header compression based on the ROHC; perform decompression of the packet retransmissions; and discard duplicate packets after performing the decompression of the packet retransmissions.

In aspect 11, the apparatus of aspect 10 further includes that the memory and the at least one processor are further configured to perform the method of any of claims 2-7.

Aspect 12 is anon-transitory computer-readable medium storing computer executable code for wireless communication at a receiving device, the code when executed by a processor cause the processor to perform the method of any of claims 1-7.

Aspect 13 is a method of wireless communication at a receiving device, comprising: receiving a plurality of packets based on a first ROHC context; re-establishing a PDCP entity; resetting to a second ROHC context; and transmitting a PDCP status report for the plurality of packets, wherein the PDCP status report indicates a NACK for each packet starting from a first lost packet.

In aspect 14, the method of aspect 13 further comprises: receiving a retransmission of each packet starting from the first lost packet based on the second ROHC context.

In aspect 15, the method of aspect 13 or aspect 14 further comprises: performing decompression of the retransmission of each packet starting from the first lost packet.

In aspect 16, the method of any of aspects 13-15 further includes that the receiving device does not decompress packets out of order.

In aspect 17, the method of any of aspects 13-16 further includes that the receiving device does not decompress packets out of order before resetting to the second ROHC context.

In aspect 18, the method of any of aspects 13-17 further comprises: transmitting, before the PDCP status report, an RLC ACK for successfully received packets from the plurality of packets based on the first ROHC context including one or more successfully received packets following the first lost packet.

Aspect 19 is an apparatus for wireless communication at a receiving device, comprising: means for receiving a plurality of packets based on a first ROHC context; means for re-establishing a PDCP entity; means for resetting to a second ROHC context; and means for transmitting a PDCP status report for the plurality of packets, wherein the PDCP status report indicates a NACK for each packet starting from a first lost packet.

In aspect 20, the apparatus of aspect 19 further comprises means to perform the method of any of claims 14-18.

Aspect 21 is an apparatus for wireless communication at a receiving device, comprising: a memory; and at least one processor coupled to the memory, the memory and the at least one processor configured to: receive a plurality of packets based on a first ROHC context; re-establish a PDCP entity; reset to a second ROHC context; and transmit a PDCP status report for the plurality of packets, wherein the PDCP status report indicates a NACK for each packet starting from a first lost packet.

In aspect 22, the apparatus of aspect 21 further includes that the memory and the at least one processor are further configured to perform the method of any of claims 14-18.

Aspect 23 is a non-transitory computer-readable medium storing computer executable code for wireless communication at a receiving device, the code when executed by a processor cause the processor to perform the method of any of claims 13-18.

Aspect 24 is a method of wireless communication at a transmitting device, comprising: transmitting a plurality of packets based on a first ROHC context; receiving a RLC ACK for successfully received packets from the plurality of packets based on the first ROHC context; re-establishing a PDCP entity; resetting to a second ROHC context; and receiving a PDCP status report for the plurality of packets, wherein the PDCP status report indicates a NACK for each packet starting from a first lost packet.

In aspect 25, the method of aspect 24 further comprises: transmitting a retransmission of each packet starting from the first lost packet based on the second ROHC context.

In aspect 26, the method of aspect 24 or aspect 25 further includes that the PDCP status report indicates the NACK for one or more packets for which the transmitting device previously received the ACK.

In aspect 27, the method of any of aspects 24-26 further includes that the transmitting device transmits a retransmission for the one or more packets for which the transmitting device previously received the ACK.

Aspect 28 is an apparatus for wireless communication at a transmitting device, comprising: means for transmitting a plurality of packets based on a first ROHC context; means for receiving a RLC ACK for successfully received packets from the plurality of packets based on the first ROHC context; means for re-establishing a PDCP entity; means for resetting to a second ROHC context; and means for receiving a PDCP status report for the plurality of packets, wherein the PDCP status report indicates a NACK for each packet starting from a first lost packet.

In aspect 29, the apparatus of aspect 28 further comprises means to perform the method of any of claims 25-27.

Aspect 30 is an apparatus for wireless communication at a transmitting device, comprising: a memory; and at least one processor coupled to the memory, the memory and the at least one processor configured to: transmit a plurality of packets based on a first ROHC context; receive a RLC ACK for successfully received packets from the plurality of packets based on the first ROHC context; re-establish a PDCP entity; reset to a second ROHC context; and receive a PDCP status report for the plurality of packets, wherein the PDCP status report indicates a NACK for each packet starting from a first lost packet.

In aspect 31, the apparatus of aspect 30 further includes that the memory and the at least one processor are further configured to perform the method of any of claims 25-27.

Aspect 32 is a non-transitory computer-readable medium storing computer executable code for wireless communication at a transmitting device, the code when executed by a processor cause the processor to perform the method of any of claims 24-27.

Aspect 33 is a method of wireless communication at a transmitting device, comprising: transmitting one or more first packets based on a first ROHC profile; re-establishing a PDCP entity; resetting a ROHC context; compressing a retransmission of the one or more first packets based on a second ROHC profile; compressing one or more second packets of an initial transmission based on the first ROHC profile; and transmitting the retransmission of the one or more first packets and the one or more second packets of the initial transmission.

In aspect 34, the method of aspect 33 further includes that the first ROHC profile comprises a profile 6, and the second ROHC profile comprises a profile 0.

In aspect 35, the method of aspect 33 or aspect 34 further comprises: receiving a PDCP status report; and discarding acknowledged packets indicated in the PDCP status report prior to compressing the retransmission of the one or more packets.

Aspect 36 is an apparatus for wireless communication at a transmitting device, comprising: means for transmitting one or more first packets based on a first ROHC profile; means for re-establishing a PDCP entity; means for resetting a ROHC context; means for compressing a retransmission of the one or more first packets based on a second ROHC profile; means for compressing one or more second packets of an initial transmission based on the first ROHC profile; and means for transmitting the retransmission of the one or more first packets and the one or more second packets of the initial transmission.

In aspect 37, the apparatus of aspect 36 further comprises means to perform the method of any of claims 34-35.

Aspect 38 is an apparatus for wireless communication at a transmitting device, comprising: a memory; and at least one processor coupled to the memory, the memory and the at least one processor configured to: transmit one or more first packets based on a first ROHC profile; re-establish a PDCP entity; reset a ROHC context; compress a retransmission of the one or more first packets based on a second ROHC profile; compress one or more second packets of an initial transmission based on the first ROHC profile; and transmit the retransmission of the one or more first packets and the one or more second packets of the initial transmission.

In aspect 39, the apparatus of aspect 38 further includes that the memory and the at least one processor are further configured to perform the method of any of claims 34-35.

Aspect 40 is a non-transitory computer-readable medium storing computer executable code for wireless communication at a transmitting device, the code when executed by a processor cause the processor to perform the method of any of claims 33-35.

Aspect 41 is a method of wireless communication at a receiving device, comprising: receiving one or more packets based on a first ROHC profile; re-establishing a PDCP; resetting a ROHC context; receiving a retransmission of at least one packet based on a second ROHC profile; and receiving an initial transmission based on the first ROHC profile.

In aspect 42, the method of aspect 41 further includes that the first ROHC profile comprises a profile 6, and the second ROHC profile comprises a profile 0.

In aspect 43, the method of aspect 41 or aspect 42 further comprises: transmitting a PDCP status report.

Aspect 44 is an apparatus for wireless communication at a receiving device, comprising: means for receiving one or more packets based on a first ROHC profile; means for re-establishing a PDCP; means for resetting a ROHC context; means for receiving a retransmission of at least one packet based on a second ROHC profile; and means for receiving an initial transmission based on the first ROHC profile.

In aspect 45, the apparatus of aspect 44 further comprises means to perform the method of any of claims 42-43.

Aspect 46 is an apparatus for wireless communication at a receiving device, comprising: a memory; and at least one processor coupled to the memory, the memory and the at least one processor configured to: receive one or more packets based on a first ROHC profile; re-establish a PDCP; reset a ROHC context; receive a retransmission of at least one packet based on a second ROHC profile; and receive an initial transmission based on the first ROHC profile.

In aspect 47, the apparatus of aspect 46 further includes that the memory and the at least one processor are further configured to perform the method of any of claims 42-43.

Aspect 48 is a non-transitory computer-readable medium storing computer executable code for wireless communication at a receiving device, the code when executed by a processor cause the processor to perform the method of any of claims 33-35.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication performed by a receiving device, comprising:
re-establishing a packet data convergence protocol (PDCP) entity;
resetting a robust header compression (ROHC) context;
receiving packet retransmissions having header compression based on the ROHC; and
performing decompression of the packet retransmissions, wherein:
up to decompressing a final lost packet before the PDCP entity was re-established, the receiving device discards duplicate packets after performing the decompression of the packet retransmissions; and
after decompressing the final lost packet, the receiving device discards the duplicate packets before performing the decompression.

2. The method of claim 1, wherein the receiving device discards a duplicate packet after performing the decompression of the packet retransmissions if the duplicate packet duplicates a packet received before the PDCP entity was re-established.

3. The method of claim 2, wherein the receiving device discards the duplicate packet before performing the decompression if the duplicate packet duplicates the packet received after the PDCP entity is re-established.

4. The method of claim 1, wherein the receiving device discards the duplicate packets after performing the decompression of the packet retransmissions until a timer expires, and wherein after the timer expires the receiving device discards the duplicate packets before performing the decompression.

5. The method of claim 1, wherein the receiving device discards the duplicate packets after performing the decompression of the packet retransmissions until feedback is received from an ROHC decompressor, and wherein after the feedback from the ROHC decompressor, the receiving device discards the duplicate packets before performing the decompression.

6. The method of claim 5, wherein the feedback indicates that the ROHC decompressor has a valid ROHC context.

7. An apparatus for wireless communication, comprising:
a processing system configured to:
re-establish a packet data convergence protocol (PDCP) entity;
reset a robust header compression (ROHC) context;
receive packet retransmissions having header compression based on the ROHC; and
perform decompression of the packet retransmissions, wherein:
up to decompression of a final lost packet before the PDCP entity was re-established, the processing system is configured to discard duplicate packets after performing the decompression of the packet retransmissions; and
after decompression of the final lost packet, the processing system is configured to discard the duplicate packets before performing the decompression.

8. The apparatus of claim 7, wherein the processing system is configured to discard a duplicate packet after the decompression of the packet retransmissions if the duplicate packet duplicates a packet received before the PDCP entity was re-established.

9. The apparatus of claim 8, wherein the processing system is configured to discard the duplicate packet before the decompression if the duplicate packet duplicates the packet received after the PDCP entity is re-established.

10. The apparatus of claim 7, wherein the processing system is configured to discard the duplicate packets after the decompression of the packet retransmissions until a timer expires, and wherein after the timer expires the processing system is configured to discard the duplicate packets before the decompression.

11. The apparatus of claim 7, wherein the processing system is configured to discard the duplicate packets after the decompression of the packet retransmissions until feedback is received from an ROHC decompressor, and wherein after the feedback from the ROHC decompressor, the processing system is configured to discard the duplicate packets before the decompression.

12. The apparatus of claim 11, wherein the feedback indicates that the ROHC decompressor has a valid ROHC context.

13. A non-transitory computer-readable storage medium comprising code stored thereon that, when executed by an apparatus, causes the apparatus to:
re-establish a packet data convergence protocol (PDCP) entity;
reset a robust header compression (ROHC) context;
receive packet retransmissions having header compression based on the ROHC; and
perform decompression of the packet retransmissions, wherein:
up to decompression of a final lost packet before the PDCP entity was re- established, the code causes the apparatus to discard duplicate packets after performing the decompression of the packet retransmissions; and
after decompression of the final lost packet, the code causes the apparatus to discard the duplicate packets before performing the decompression.

14. The non-transitory computer-readable storage medium of claim 13, wherein the code, when executed, causes the apparatus to discard a duplicate packet after the decompression of the packet retransmissions if the duplicate packet duplicates a packet received before the PDCP entity was re-established.

15. The non-transitory computer-readable storage medium of claim 14, wherein the code, when executed, causes the apparatus to discard the duplicate packet before the decompression if the duplicate packet duplicates the packet received after the PDCP entity is re- established.

16. The non-transitory computer-readable storage medium of claim 13, wherein the code, when executed, causes the apparatus to discard the duplicate packets after the decompression of the packet retransmissions until a timer expires, and wherein after the timer expires the code, when executed, causes the apparatus to discard the duplicate packets before the decompression.

17. The non-transitory computer-readable storage medium of claim 13, wherein the code, when executed, causes the apparatus to discard the duplicate packets after the decompression of the packet retransmissions until feedback is received from an ROHC decompressor, and wherein after the feedback from the ROHC decompressor, the code, when executed, causes the apparatus to discard the duplicate packets before the decompression.

18. The non-transitory computer-readable storage medium of claim 17, wherein the feedback indicates that the ROHC decompressor has a valid ROHC context.

* * * * *